US007941598B2

(12) United States Patent
Kaneda et al.

(10) Patent No.: US 7,941,598 B2
(45) Date of Patent: May 10, 2011

(54) METHOD AND APPARATUS FOR CAPACITY ON DEMAND DYNAMIC CHUNK ALLOCATION

(75) Inventors: Yasunori Kaneda, San Jose, CA (US); Akira Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 11/836,056

(22) Filed: Aug. 8, 2007

(65) Prior Publication Data
US 2009/0043958 A1 Feb. 12, 2009

(51) Int. Cl.
*G06F 13/12* (2006.01)
(52) U.S. Cl. ...................................................... 711/112
(58) Field of Classification Search .................... 711/112
See application file for complete search history.

(56) References Cited

U.S. PATENT DOCUMENTS

| | | | |
|---|---|---|---|
| 6,725,328 B2 * | 4/2004 | Kano et al. ..................... 711/112 |
| 6,912,627 B2 * | 6/2005 | Matsunami et al. .......... 711/154 |
| 7,143,119 B2 * | 11/2006 | Furukawa et al. ............. 707/202 |
| 2002/0112043 A1 | 8/2002 | Kagami et al. |
| 2004/0111391 A1 * | 6/2004 | Fujita et al. ....................... 707/1 |
| 2004/0162958 A1 | 8/2004 | Kano et al. |
| 2004/0255143 A1 * | 12/2004 | Wemyss et al. ............... 713/200 |

* cited by examiner

*Primary Examiner* — Duc T Doan
(74) *Attorney, Agent, or Firm* — Sughrue Mion, PLLC

(57) ABSTRACT

The system is composed of the storage apparatuses with dynamic chunk allocation capabilities, the centralized management computer. Some storage apparatuses have the extra HDDs or volumes for providing extra capacity (extra chunks), which are concealed by a secret key. The storage apparatus with the closed segment has the key management program and key management table. The centralized management computer has the storage on demand management program, the pending request table, the priority table and the master key table. The storage apparatus may connect to the other storage apparatuses for sharing the extra capacities in the closed segment. The storage apparatus issues the chunk addition request to the centralized management computer. The centralized management computer provides a key according to the priority table and the master key table. The centralized management computer may provide the key according to the chunk consumption rate reported by the storage apparatus and/or remaining capacity in the other storage apparatuses.

11 Claims, 30 Drawing Sheets

| Parity Group Number (16801) | HDD Number (16802) | LBA Range (16803) | Chunk Number (16804) | Is Allocated (16805) | Volume Number (16806) |
|---|---|---|---|---|---|
| 1 | 101-06<br>101-07<br>101-08<br>101-09<br>101-10 | 0~4095 | 10000 | | |
| | | 4096~8191 | 10001 | | |
| | | 8192~12287 | 10002 | | |
| | | ⋮ | | | |

(b)

| Parity Group Number (16801) | HDD Number (16802) | LBA Range (16803) | Chunk Number (16804) | Is Allocated (16805) | Volume Number (16806) |
|---|---|---|---|---|---|
| 1 | 101-06<br>101-07<br>101-08<br>101-09<br>101-10 | 0~4095 | 10000 | Yes | 112 |
| | | 4096~8191 | 10001 | Yes | 112 |
| | | 8192~12287 | 10002 | Yes | 112 |
| | | ⋮ | | | |
| 2 | 102-01<br>102-02<br>102-03<br>102-04<br>102-05 | 0~4095 | 20000 | | |
| | | 4096~8191 | 20001 | | |
| | | 8192~12287 | 20002 | | |
| | | ⋮ | | | |

| Segment Number *16901* | Is Allocated *16902* | Volume Number *16903* |
|---|---|---|
| 0 | | |
| 1 | | |
| 2 | | |
| ⋮ | | |

| HDD Number (16701) | Hidden Key (16702) | Provided Key (16703) | Enabled (16704) |
|---|---|---|---|
| 102-01 | aaaaaa | | |
| 102-02 | bbbbbb | | |
| 102-03 | cccccc | | |
| 102-04 | dddddd | | |
| 102-05 | eeeeee | | |

167

(b)

| HDD Number (16701) | Hidden Key (16702) | Provided Key (16703) | Enabled (16704) |
|---|---|---|---|
| 102-01 | aaaaaa | aaaaaa | Yes |
| 102-02 | bbbbbb | bbbbbb | Yes |
| 102-03 | cccccc | cccccc | Yes |
| 102-04 | dddddd | dddddd | Yes |
| 102-05 | eeeeee | eeeeee | Yes |

| Segment Number (52901) | Chunk Pool Number (52902) | Level (52903) | Fix-Sized Volume (52904) | Requested Number of HDDs (52905) |
|---|---|---|---|---|
|  |  |  |  |  |
|  |  |  |  |  |
|  |  |  |  |  |
| ⋮ |  |  |  |  |

529

(b)

| Segment Number (52901) | Chunk Pool Number (52902) | Level (52903) | Fix-Sized Volume (52904) | Requested Number of HDDs (52905) |
|---|---|---|---|---|
| 100 | 110 | normal | No | 5 |
|  |  |  |  |  |
|  |  |  |  |  |
| ⋮ |  |  |  |  |

| Segment Number | Chunk Pool Number | Level | Fix-Sized Volume | Requested Number of HDDs |
|---|---|---|---|---|
| 100 | 110 | normal | No | 5 |
| 100 | | | Yes | 5 |
| | | | | |
| ⋮ | | | | |

| Priority | Purpose |
|---|---|
| 1 | Chunk |
| 2 | Fixed-sized Volume |

(b)

522b

| Priority | Purpose | Chunk Pool Number |
|---|---|---|
| 1 | Chunk | 110-01 |
| 2 | Fixed-sized Volume | |
| 3 | Chunk | 110-02 |

(c)

522c

| Chunk Pool Number | Priority | Storage Number |
|---|---|---|
| 110a | 1 | 100a |
| 110a | 2 | 100c |
| 110b | 1 | 100b |
| 110b | 2 | 100c |

| Chunk Pool Number | Priority | Storage Number |
|---|---|---|
| 110a | 1 | 100a |
| | 2 | 100b, 100c |
| 110b | 1 | 100b |
| | 2 | 100a, 100c |
| 110c | 1 | 100c |
| | 2 | 100a, 100b |

(e)

522e

| Chunk Pool Number | Priority | Storage Number |
|---|---|---|
| 110a | 1 | 100a |
| | 2 | 100d |

(f)

522f

| Customer Name | Chunk Pool Number | Priority | Storage Number |
|---|---|---|---|
| AA | 110a | 1 | 100d |
| BB | 110b | 2 | 100d |
| CC | 110c | 3 | 100d |

| Purpose | Key |
|---|---|
| Chunk Pool 110 | *aaaaaa* |
| | *bbbbbb* |
| | *cccccc* |
| | *dddddd* |
| | *eeeeee* |

| Storage Number | HDD Number | Key | In Use | Purpose |
|---|---|---|---|---|
| 100 | 102-01 | aaaaaa | | |
| | 102-02 | bbbbbb | | |
| | 102-03 | cccccc | | |
| | 102-04 | dddddd | | |
| | 102-05 | eeeeee | | |
| | | | | |
| | | | | |
| | | | | |
| | | | | |

(b)

| Storage Number | HDD Number | Key | In Use | Purpose |
|---|---|---|---|---|
| 100 | 102-01 | aaaaaa | Yes | Chunk |
| | 102-02 | bbbbbb | Yes | Chunk |
| | 102-03 | cccccc | Yes | Chunk |
| | 102-04 | dddddd | Yes | Chunk |
| | 102-05 | eeeeee | Yes | Chunk |
| | | | | |
| | | | | |
| | | | | |
| | | | | |

| Storage Number | Chunk Pool Number | Remain Chunks |
|---|---|---|
| 100 | 110 | 980 |

| Storage Number | Chunk Pool Number | Time Stamp | | Remain Chunks | Consumption Rate |
|---|---|---|---|---|---|
| | | Date | Time | | |
| 100 | 110 | Apr 2, 2007 | 10:58 am | 980 | 100/day |
| | | | 10:57 am | 987 | |
| | | | 10:56 am | 992 | |
| | | | ⋮ | ⋮ | |
| | | Apr 1, 2007 | 11:59 am | 1045 | 110/day |
| | | | 11:57 am | 1050 | |
| | | | 11:56 am | 1052 | |
| | | | ⋮ | ⋮ | |
| | | | | | |
| | | | | | |
| | | | | | |

| Volume Number | Hidden Key | Provided Key | Storage Number |
|---|---|---|---|
| 113c-01 | cccaaa | | |
| 113c-02 | cccbbb | | |
| 113c-03 | cccccc | | |
| ⋮ | | | |

| Storage Number (55011) | Volume Number (55012) | Key (55013) | In Use (55014) |
|---|---|---|---|
| 100a | 113a-01 | aaaaaa | |
| | 113a-02 | aaabbb | |
| | 113a-03 | aaaccc | |
| | ⋮ | | |
| 100b | 113b-01 | bbbaaa | |
| | 113b-02 | bbbbbb | |
| | 113b-03 | bbbccc | |
| | ⋮ | | |
| 100c | 113c-01 | cccaaa | |
| | 113c-02 | cccbbb | |
| | 113c-03 | cccccc | |
| | ⋮ | | |

| Chunk Pool Number | Key |
|---|---|
| *110a* | *aaaxxx* |

Fig.25

| Chunk Pool Number | Key | Capacity Limit |
|---|---|---|
| *110a* | *aaaxxx* | *1000GB* |
| ⋮ | | |

METHOD AND APPARATUS FOR CAPACITY ON DEMAND DYNAMIC CHUNK ALLOCATION

DESCRIPTION OF THE INVENTION

1. Field of the Invention

This invention is related to storage resource management and, more specifically, to techniques for adding new storage capacity to a storage device.

2. Description of the Related Art

Recently, storage systems with dynamic chunk allocation capability have been developed to reduce waste of physical blocks in storage volumes. The aforesaid method for providing dynamic chunk allocation capability for storage devices is disclosed in U.S. published patent application No. 20040162958, titled "Automated on-line expansion method for storage device." Specifically, the storage system with dynamic chunk allocation capability has volumes, however no physical blocks are allocated to the volumes initially. The storage system allocates a chunk from a chunk pool when a write command is received, which is issued by host computers. If a chunk has already been allocated to area requested by the write command, then no chunk is allocated to this area. The chunks are allocated to storage volumes from a chunk pool. If the chunk pool has no chunks available, the write command fails. To avoid write command failure, new chunks must be added to the chunk pool before the chunks run out. Thus, new extra capacity must be delivered and associated to the chunk pool before the chunks in the chunk pool run out.

This extra capacity can be ordered, for example, when the available storage in the chunk pool falls below a pre-defined threshold. An administrator or management computer can set this pre-defined threshold for automatic notification of the low available storage capacity. An administrator can order the required extra storage capacity from the storage vendor according to the notification received from the storage devices.

On the other hand, U.S. published patent application No. 20020112043, titled "Method and apparatus for storage-on-demand service" discloses an implementation of storage-on-demand (SoD) service. To shorten the time required to add extra storage capacity at a customer site, the extra capacity already available at the customer's storage device is enabled remotely. In the system described in this reference, the extra storage capacity is already provided within the customer storage apparatus, but not "associated," enabling its use by the storage allocation manager. On the other hand, in conventional storage-on-demand (SoD) systems, the extra capacity already available within the storage apparatus is associated using a SoD demand received from the host computer.

However, the conventional storage resource management techniques fail to enable provision of extra capacity (adding new chunks) with short latency by applying the storage-on-demand steps for storage devices with dynamic chunk allocation capability.

SUMMARY OF THE INVENTION

The inventive methodology is directed to methods and systems that substantially obviate one or more of the above and other problems associated with conventional techniques for storage resource management.

In accordance with one aspect of the inventive concept, there is provided a data storage system including a storage controller operable to manage at least one dynamic volume having data storage areas allocated from a pool according to a write request position and a data storage area allocation status; at least one first storage area available for data storage and operable to be allocated to the pool; at least one second storage area not available for data storage and secured by a key; and a networking interface operable to communicate with a storage on demand management system. The aforesaid storage controller is operable to issue a storage area addition request to the storage on demand management system and receive from the storage on demand management system the key and use the received key to cause the at least one second storage area to become available for data storage.

In accordance with another aspect of the inventive concept, there is provided a method involving: creating at least one dynamic volume; allocating storage areas from a pool to the dynamic volume according to a write request position and a data storage area allocation status; providing at least one first storage area available for data storage and operable to be allocated to the pool and providing at least one second storage area not available for storage and secured by a key. The inventive method further involves issuing a storage area addition request to a storage on demand management system; receiving from the storage on demand management system the key; and using the received key to cause the at least one second storage area to become available for storage.

In accordance with yet another aspect of the inventive concept, there is provided a computer readable medium storing instructions implementing an inventive method involving creating at least one dynamic volume; allocating data storage areas from a pool to the dynamic volume according to a write request position and a data storage area allocation status; providing at least one first storage area available for data storage and operable to be allocated to the pool and providing at least one second storage area not available for storage and secured by a key. The inventive method further involves issuing a storage area addition request to a storage on demand management system; receiving from the storage on demand management system the key; and using the received key to cause the at least one second storage area to become available for storage.

In accordance with a further aspect of the inventive concept, there is provided a data storage system including: a volume comprising a plurality of data storage areas; a pool for maintaining unused data storage areas; and storage controller. The storage controller allocates at least one unused data storage areas from the pool to the volume according to a write request and a data storage area allocation status; mounts at least one second volume from another data storage system connected to the data storage system according to a status of the pool; and assigns the mounted second volume to the pool.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIGS. 5(a)-(b) illustrate an exemplary embodiment of a chunk pool management table 168.

FIG. 6 illustrates an exemplary embodiment of a chunk table 169.

FIGS. 7(a)-(b) illustrate an exemplary embodiment of a key management table 167.

FIG. 11(a)-(c) illustrates an exemplary embodiment of a pending request table 529.

FIGS. 12(a)-(f) illustrate exemplary embodiments of priority table 522.

FIG. 13 illustrates an exemplary embodiment of a key 1300.

FIGS. 14(a)-(b) illustrate an exemplary embodiment of a master key table 550.

FIG. 16 illustrates an exemplary embodiment of a chunk pool report 1600.

FIG. 17 illustrates an exemplary embodiment of a chunk pool log.

FIG. 20 illustrates an exemplary embodiment of a key management table 167c.

FIG. 21 illustrates an exemplary embodiment of a master key table 550.

FIG. 24 illustrates an exemplary embodiment of a request key.

FIG. 25 illustrates another exemplary embodiment of a master key table.

DETAILED DESCRIPTION

Figure 1:
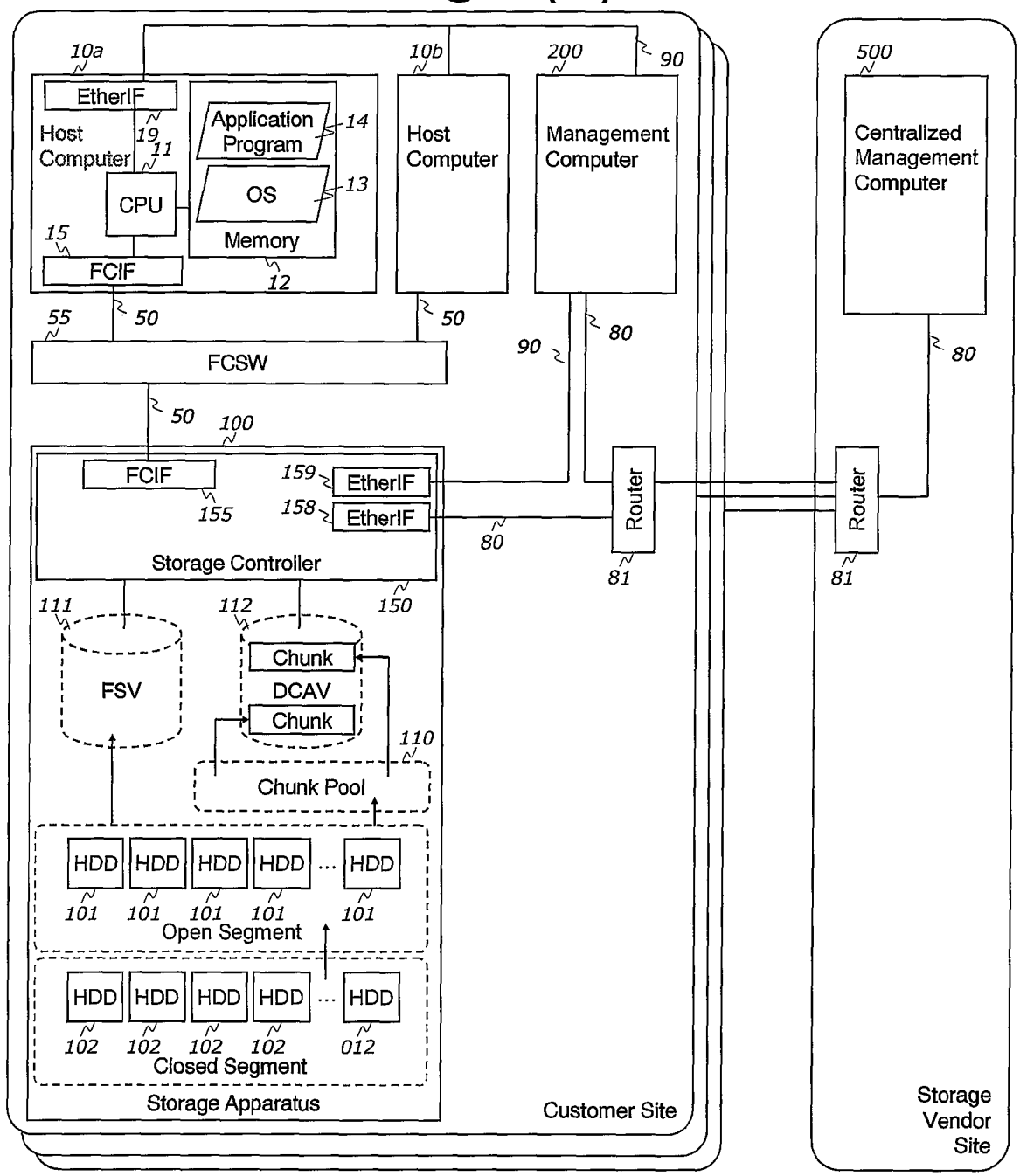
FIGS. 1(a)-1(d) illustrate an exemplary embodiment of an information system in which the method of this invention can be applied.
Figure 1:
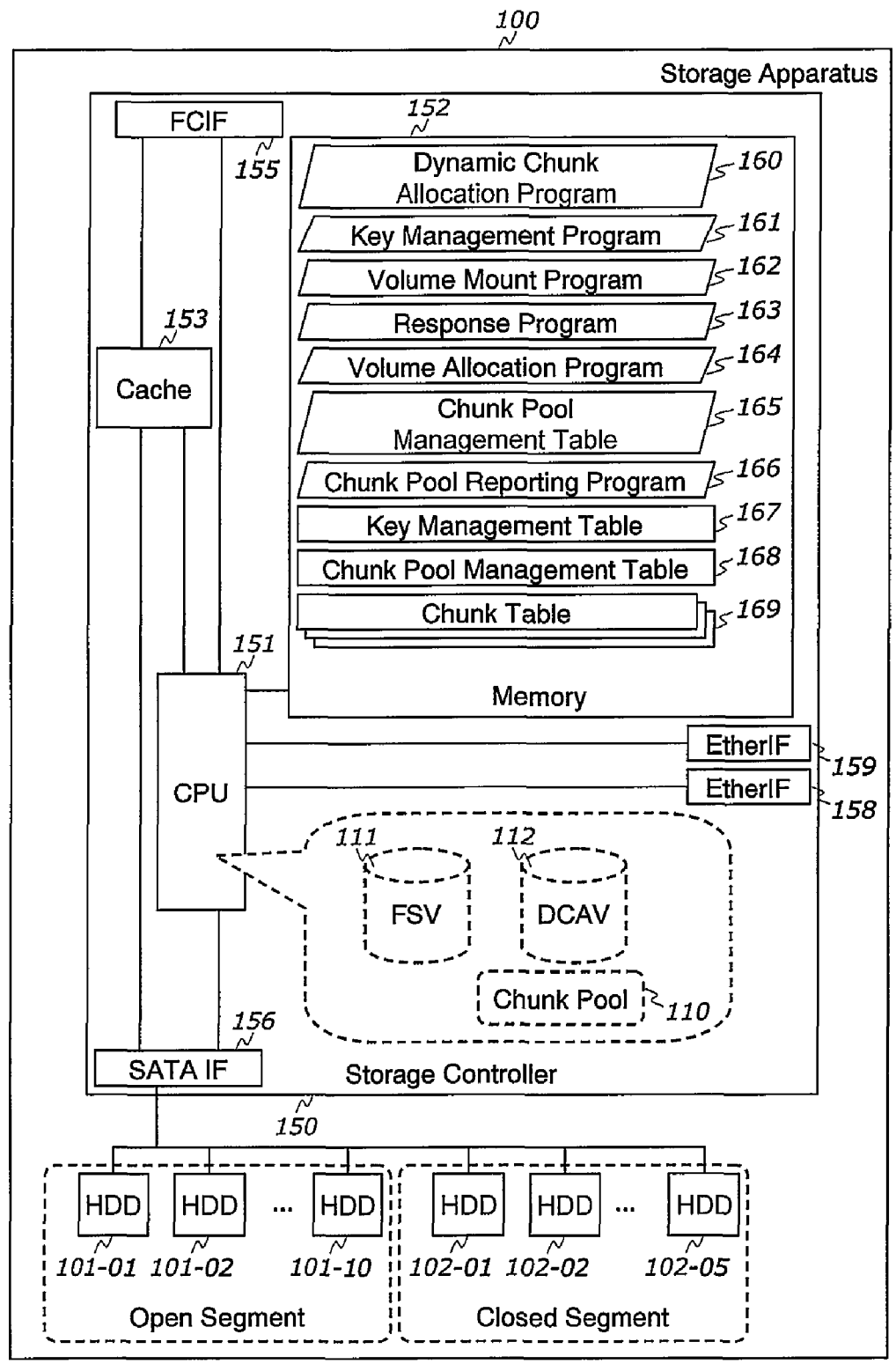
Figure 1:
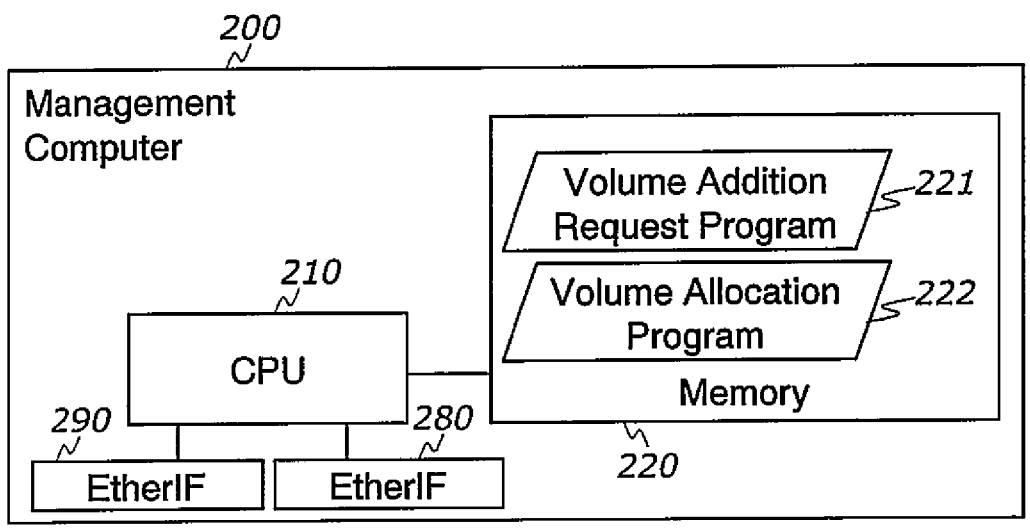
Figure 1:
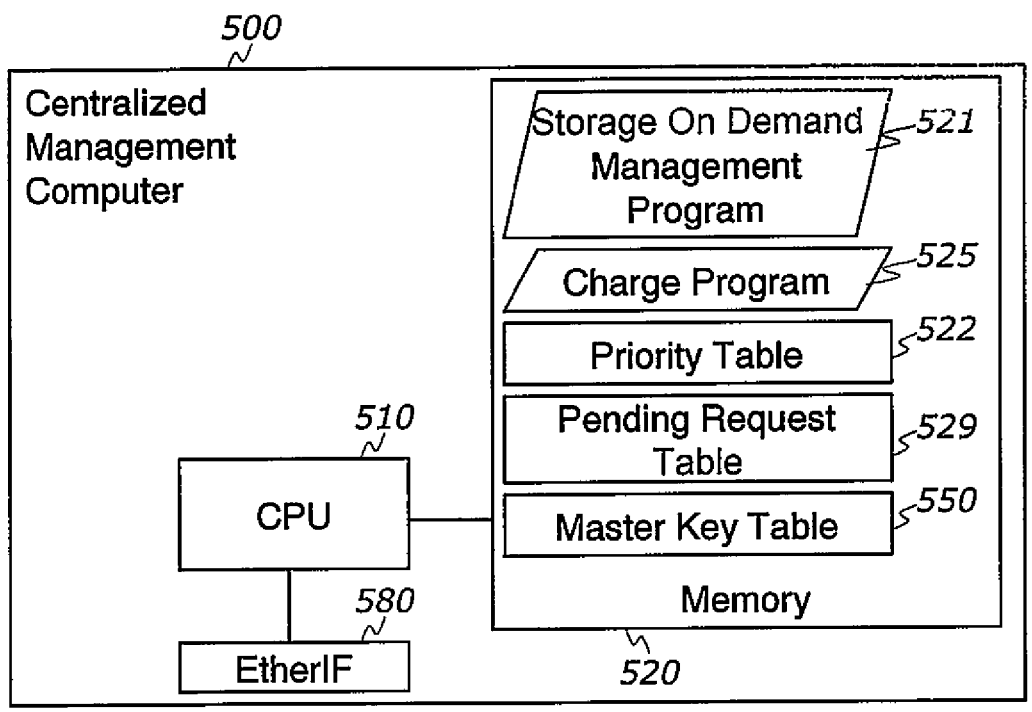

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

First Embodiment

System Configuration

FIG. 1(a) illustrates an exemplary embodiment of the computerized storage system in which the techniques of this invention are applied. The computerized storage system of the aforesaid first embodiment includes:

Host Computer 10:

In an embodiment of the inventive technique, at least one host computer 10 is connected to the storage apparatus 100 via data network 50. In the embodiment shown in FIG. 1, two host computers 10a, 10b are so connected. The host computers 10 execute at least one operating system (OS) 13. As it will be appreciated by those of skill in the art, the present invention is not limited to any specific OS 13. Any suitable operating systems, such as Windows, Unix, Linux and the like may be employed as the OS 13. Also, an application 14 may be executed by the host computer 10 under the direction of the OS 13. Files and data for the OS 13 and the application 14 are stored in one or more storage volumes, which are provided by the storage apparatus 100. The OS 13 and the application 14 issue write and/or read commands to the storage apparatus 100 in order to access the stored files and data.

Centralized Management Computer 500:

At least one centralized management computer 500 is connected to the storage apparatus 100 and the management computer 200 via a remote network 80. In this embodiment, two routers 81 are used for connecting the storage apparatus 100, the management computer 200 and centralized management computer 500. Each router 81 is located at each site (customer site and storage vendor site).

Storage Apparatus 100:

The described embodiment includes at least one storage apparatus 100, which incorporates storage controller 150 and one or more had disk drives (HDDs) 101 and 102. The HDDs 101 and 102 are divided into two segments. The first segment is called open segment. The other is called closed segment. HDDs 101 in the open segment can be used for fix-sized volume (FSV) or chunks. HDDs 102 in the closed segment cannot be used without a secret key furnished by the centralized management computer 500. The storage apparatus 100 in the depicted embodiment has multiple HDDs 102 in the closed segment. HDDs 102 in the closed segment are hidden from the users of the hosts 10a and 10b and are initially unavailable for storing data and files.

Storage controller 150 may apply an array algorithm for protecting data stored in the HDDs. The storage apparatus 100 has one or more chunk pools 110, which is composed of one or more HDDs 101. The storage apparatus 100 provides one or more storage volumes to the host computers 10a and 10b. In this embodiment, the storage apparatus 100 incorporates a dynamic chunk allocation program 160, as shown in FIG. 1(b). The aforesaid storage volumes may be created as dynamic chunk allocation volumes (DCAV). Alternatively, the storage volumes may be created as conventional volumes (fix-sized volumes). Thus, the storage apparatus the embodiment shown in FIG. 1(a) may have two types of storage volumes; dynamic chunk allocation volumes and fix-sized volumes.

Data Network 50:

The host computers 10a and 10b and the storage apparatus 100 are interconnected via a data network 50. The data network 50 in this embodiment is a Fibre Channel network. However other network technologies, such as Ethernet and Infiniband can be used in the implementation of the network 50. Network switches and hubs using various technologies can be used for interconnecting various elements of the network 50. Specifically, in the embodiment shown in FIG. 1(a), Fibre Channel Switch 55 (FCSW 55) is used for interconnecting the host computers 10a and 10b as well as the storage apparatus 100. To this end, the host computer 10 and storage apparatus 100 have one or more Fibre Channel interface board (FCIF) for connecting to the Fibre Channel data network 50.

Remote Network 80:

The storage apparatus 100 and the management computer 200 are connected to the centralized management computer 500 via a remote network 80. The remote network 80 in the embodiment shown in FIG. 1(a) is implemented using the Ethernet technology. However other suitable network technologies can be used in implementing the remote network 80. In the shown exemplary embodiment, the centralized management computer 500, management computer 200 and the storage apparatus 100 have one or more Ethernet interface boards (for example, EtherIF 158 in FIG. 1(a)) to facilitate connecting the storage apparatus 100 to the Ethernet-based remote network 80.

Management Network 90:

The host computer 10 and the storage apparatus 100 are connected to the management computer 200 via a management network 90. The management network 90 in the shown embodiment is implemented using Ethernet technology. However, other network technologies can be used for this purpose. To facilitate the connection to the management network 90, the management computer 200, the host computers 10a and 10b and the storage apparatus 100 each have one or more Ethernet interface board (for example, EtherIF 159 in FIG. 1(a)).

Configuration of the Host Computer 10:

In the embodiment shown in FIG. 1, the host computers 10a and 10b include a CPU 11 for executing various programs stored in memory 12, a memory 12 for storing the programs and data; a Fibre Channel interface (FCIF) 15 for connecting to the data network 50 and Ethernet interface (EtherIF) 19 for connecting the computer 10 to the management network 90. In the shown embodiment, the CPU 11 executes at least two programs, which are store in the memory 12. Specifically, in this embodiment, the memory 12 of the host computers 10a and 10b stores operating system program 13 (OS 13) and application program 14, which are both executed by the CPU 11.

Configuration of the Management Computer 200

The management computer 200 is illustrated in FIG. 1(c). It incorporates: CPU 210 for executing programs stored in a memory 220; the memory 220 for storing the programs and data; Ethernet interface (EtherIF) 280 for connecting the management computer 200 to the remote network 80 and Ethernet interface (EtherIF) 290 for connecting the management computer to the management network 90. In the shown embodiment of the management computer 200, the CPU 210 executes at least two programs, which are stored by the memory 220. Specifically, the memory 220 stores a volume addition request program 221 for issuing a volume addition request to the centralized management computer 500 and a volume allocation program 222 for requesting the storage controller to create a volume and associating a volume to the host computer 10.

Configuration of the Centralized Management Computer 500:

In a specific embodiment of the invention shown in FIG. 1(d), the centralized management computer 500 may incorporate: CPU 510 for executing programs stored in memory 520; memory 520 for storing the programs and data; Ethernet interface (EtherIF) 580 for connecting the centralized management computer to the remote network 80. In the shown embodiment, the CPU 510 executes at least two programs stored in the memory 520. Specifically, the memory 520 stores a storage on demand management program 521 for managing the master key table and priorities for providing keys and a charging program 525 for charging the user for usage of extra HDDs and/or volumes.

Configuration of the Storage Apparatus 100:

The storage apparatus 100 illustrated in detail in FIG. 1(b) is composed of: one or more HDDs 101 disposed in the open segment and one or more HDDs 102 disposed in the closed segment. In addition, the storage apparatus 100 incorporates a storage controller 150 for managing storage volumes. The embodiment of the storage apparatus 100 shown in FIG. 1(b) incorporates one or more storage volumes, which include fix-sized volume 111 and dynamic chunk allocation volume 112. In addition, the storage apparatus 100 also includes one or more chunk pools 110.

As shown in FIG. 1(b), the storage controller 150 may incorporate CPU 151 for executing programs stored in a memory 152; the memory 152 for storing programs and data; Fibre Channel interface FCIF 155 for connecting the storage apparatus 100 to the data network 50 and SATA interface (IF) 156 for connecting to the HDD 101 and 102. It should be noted that if the utilized HDD uses a different interface technology, such as FC, SCSI SAS, appropriate interfaces should be provided in place or in addition to the SATA interface 156. Thus, the present invention is not limited to any specific interface type or technology. The storage controller 150 may further include cache 153 for storing data received from the host computer and read from the HDDs and other storage apparatuses; Ethernet interface (EtherIF) 158 for connecting to the remote network 80 and Ethernet interface (EtherIF) 159 for connecting the storage controller 150 to the management network 90. In the embodiment of the storage controller 150 illustrated in FIG. 1(b), the CPU 151 executes at least seven programs, stored in the memory 152. Specifically, the memory 152 stores: a dynamic chunk allocation program 160 for allocating one or more chunk to volumes when a write request is received and no chunk has been previously allocated; a key management program 161 for managing the key management table when a key is received from the centralized management computer 500; a mount program 162 for mounting volumes in other storage apparatuses and a response program 163 for responding to READ/WRITE/READ CAPACITY command from the host computer 10.

In addition, the memory 152 of the storage controller 150 stores a volume allocation program 164 for creating fix-sized volumes and allocating them to the host computer 10; a chunk pool management program 165 for creating new chunks and associating them to appropriate chunk pool and a chunk pool reporting program 166 for reporting number of remaining chunks in the chunk pool 110.

Figure 2:
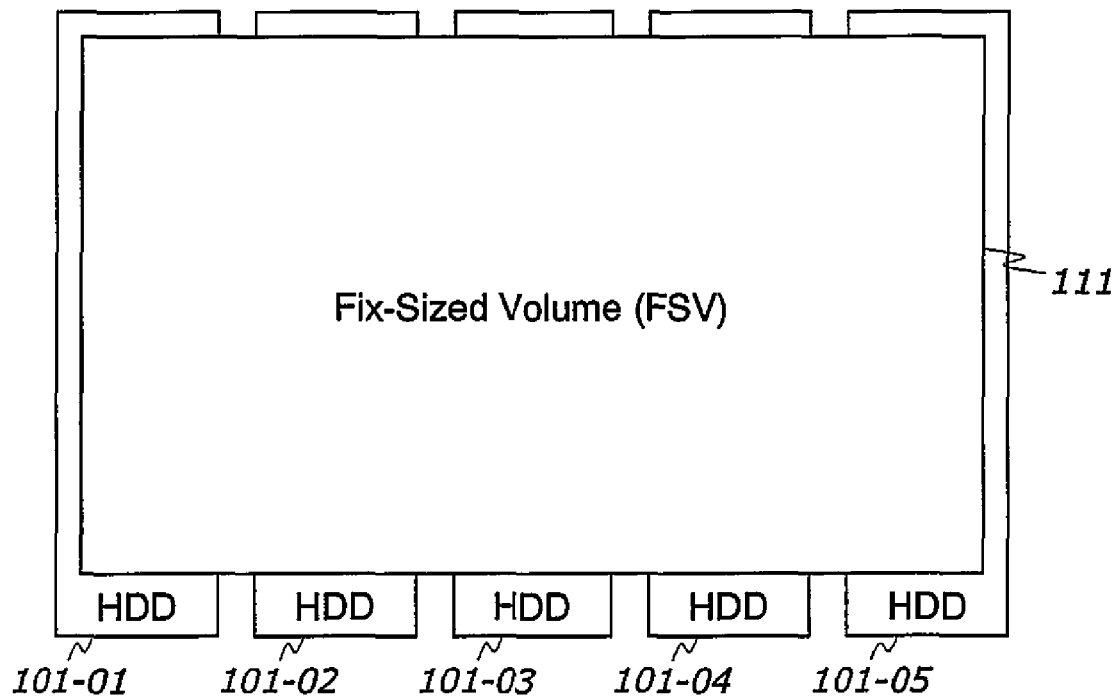
FIG. 2 illustrates an exemplary embodiment of a fix-sized volume 111.

Fix-Sized Volume (FSV):

A fix-sized volume (FSV) is a conventional storage volume. Required number of storage data blocks, which is determined by the size of the fix-sized volume, is allocated to such volume upon its creation. FIG. 2 illustrates an exemplary embodiment of the fix-sized volume 111. The embodiment of the fixed-size volume 111, shown in FIG. 2, is composed of five HDDs 101. In the shown configuration, each of the constituent HDDs 101 provides data blocks to the fixed-size volume 111. In one example, the size of the volume 111 is 1000 GB, the number of HDD is five and RAID5 algorithm is applied, with each HDD providing 250 GB to the volume 111 at the time when the volume 111 is created.

Figure 3:
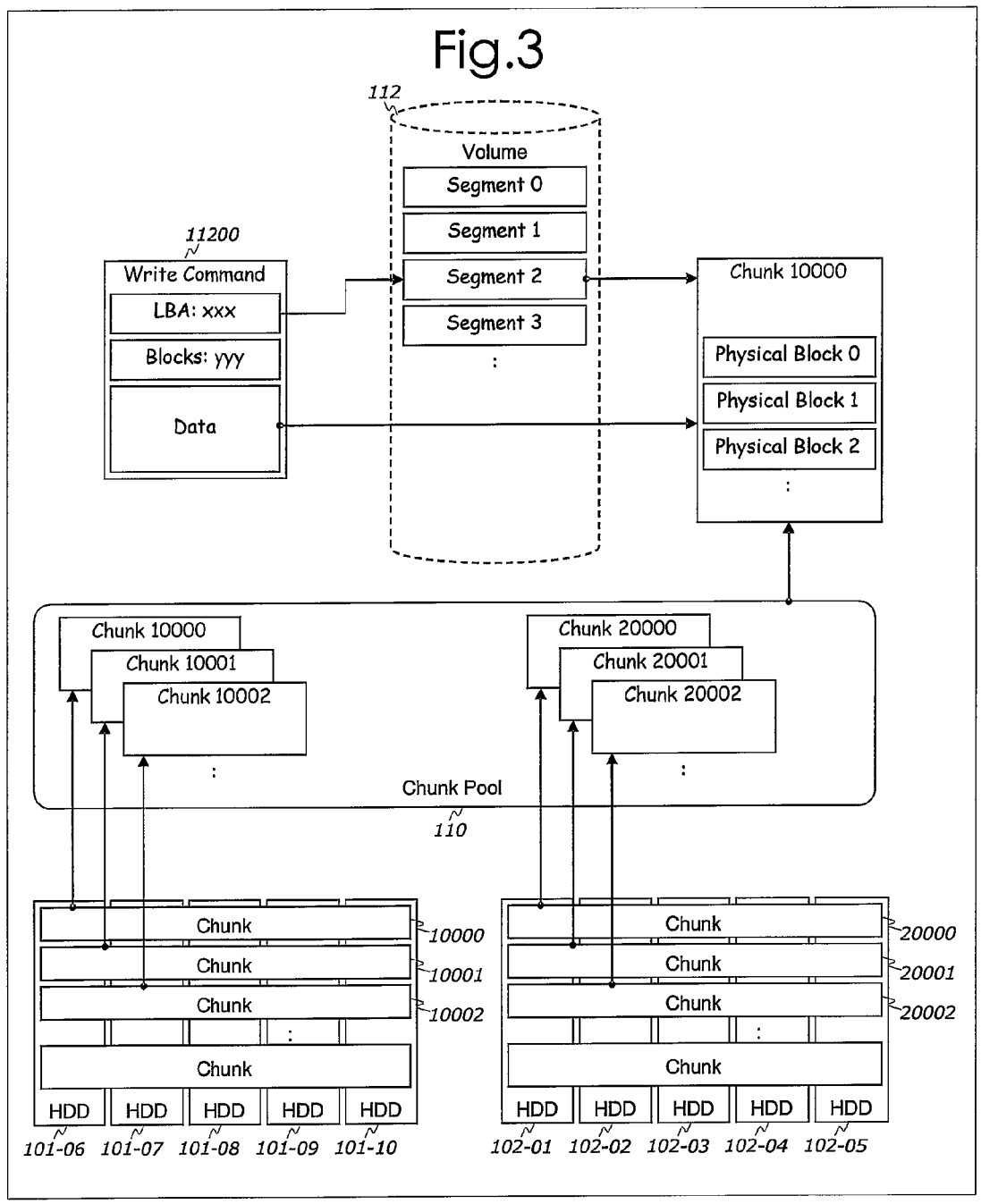
FIG. 3 illustrated relationship between write command, dynamic chunk allocation volume 112, chunk pool 110, chunks and HDDs.

Dynamic Chunk Allocation Volume (DCAV):

Dynamic chunk allocation volume (DCAV) is a second commonly used volume type. Upon the creation of the dynamic chunk allocation volume, no data blocks are allocated to it. FIG. 3 illustrates a relationship between a write command, the dynamic chunk allocation volume 112, the chunk pool 110, and the chunks and HDDs. In the example shown in FIG. 3, the size of the dynamic chunk allocation volume 112 is 10000 GB. However, no data blocks are allocated to the volume 112 upon its creation, but only the size of the volume is assigned thereto. The data blocks are actually allocated to the dynamic chunk allocation volume 112 when it receives a write command with data from the host computer. That is, in the described embodiment, a chunk is allocated to the volume 112, when the volume 112 receives the write command 11200. The allocated chunk is actually a collection of data blocks from the HDDs. The dynamic chunk allocation volume 112 is divided into multiple segments (for example, segment 0-3), as show in FIG. 3. The size of the chunk and the size of the segment are the same in this embodiment.

Figure 4:
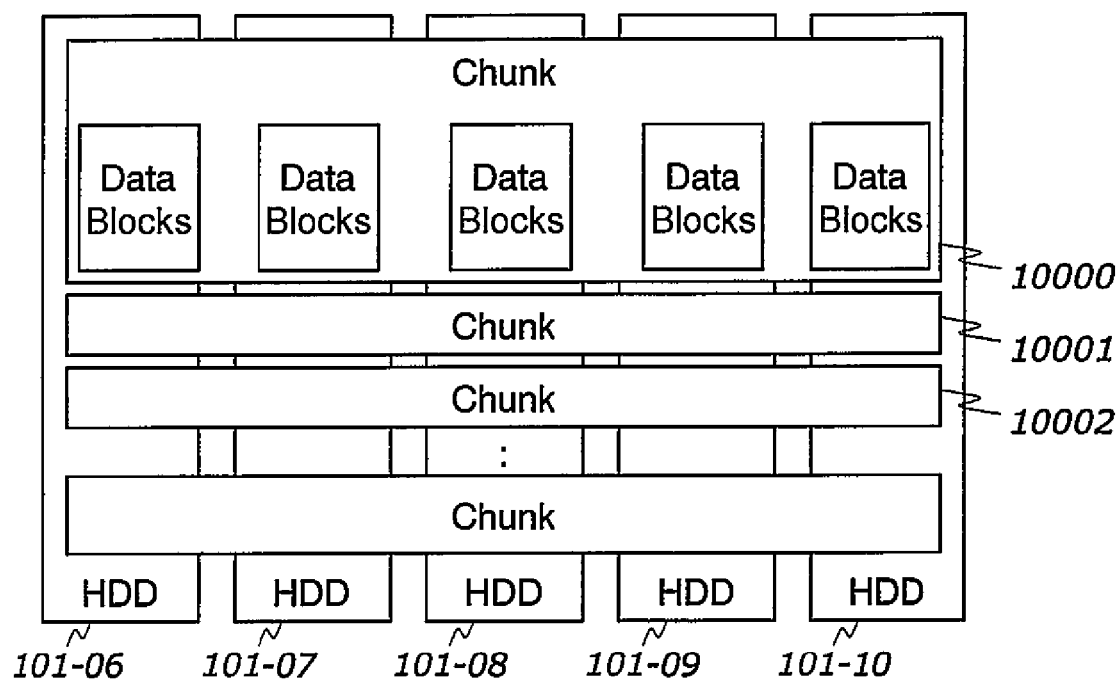
FIG. 4 illustrates an exemplary embodiment of a chunk configuration.

Chunk and Chunk Pool:

FIG. 4 illustrates exemplary chunk configuration. A chunk is composed of one or more data blocks of the HDDs. In this embodiment, a chunk is composed of blocks located on five different HDDs. Each chunk has a unique ID for identifying the chunk. Unused chunks are managed as a chunk pool. The chunk pool is managed using a chunk pool management table. In this embodiment, the storage apparatus 100 incorporates one chunk pool 110. Therefore, the storage apparatus 100 incorporates one chunk pool management table for managing the single chunk pool 110. However, as would be appreciated by those of skill in the art, any suitable number of chunk pools can be used in the storage apparatus 110.

Chunk Pool Management Table:

FIG. 5(*a*) illustrates an exemplary configuration of the chunk pool management table 168. The shown exemplary embodiment of the chunk pool management table 168 incorporates a "Parity Group Number" column 16801 for storing a parity group number, which is assigned to the parity group, an "HDD Number" column 16802 for storing a HDD numbers, which are in the parity group, an "LBA Range" column 16803 for storing an LBA range corresponding to the chunk and a "Chunk Number" column 16804 for storing a chunk number for identifying a chunk. In addition the chunk pool management table 168 may include an "Is Allocated" column 16805 for storing a status whether the chunk has been allocated to a volume or not and a "Volume Number" column 16806 for storing a volume number, which the chunk has been allocated to the segment.

As stated above, no chunks are initially allocated to the dynamic chunk allocation volume. Therefore, all cells in the row 16805 and the row 16806 will have NULL values.

Chunk Table:

FIG. 6 illustrates an exemplary embodiment of a chunk table 169 associated with the dynamic chunk allocation volume. The chunk table 169 includes "Segment Number" column 16901 for storing a segment number identifying the segment; "Is Allocated" column 16902 for storing a status indicator indicating whether a chunk has been allocated or not; "Chunk Number" column 16903 for storing a chunk number, which the chunk has been allocated to No chunk is allocated to the dynamic chunk allocation volume initially. Therefore all records in the row 16902 and the row 16903 of the chunk table 169 have NULL values.

Extra HDDs:

The storage apparatus 100 in the described exemplary embodiment of the invention incorporates additional unused HDDs to enable immediate expansion of its storage capacity. These extra HDDs are installed and concealed from the users by means of hidden secret key(s), installed when the storage apparatus is shipped to the customer. Thus, these extra HDDs are unavailable and the storage system administrator is unable to use these extra HDDs because they are invisible to the management computer 200 associated with the storage apparatus 100. On the other hand, the storage apparatus 100 maintains a key management table 167, which resides in the memory 152. In particular, the configuration of the key management table 167 is illustrated in detail in FIG. 7(*a*). In the described exemplary embodiment of the invention, each additional hidden HDD has its own hidden key.

As illustrated in FIG. 7, the key management table 167 is composed of: an "HDD Number" column 16701 for storing an HDD number for identifying an HDD; a "Hidden Key" column 16702 for storing a hidden key corresponding to the respective HDD. The Hidden Key is provided when the extra HDD is shipped with the storage apparatus 100. The key management table 167 further includes "Provided Key" column 16703 for storing a key provided from centralized management computer via remote network and "Enabled" column 16704 for storing a result of key matching operation. The aforesaid matching operation operates on the hidden key and the provided key. The respective HDD is enabled is the Provided Key matches the Hidden Key.

In the shown embodiment, only one hidden key is provided for enabling each extra HDDs. The extra HDD is enabled when a provided key matching the hidden key is provided from the centralized management computer 500. Initially, the key management table 167 contains no matching key pairs. If a matched key is provided from the centralized management computer 500, the HDD corresponding to that key is enabled and becomes available to the storage system. The HDD that becomes available can be used for chunks and fix-sized volumes.

Figure 8:
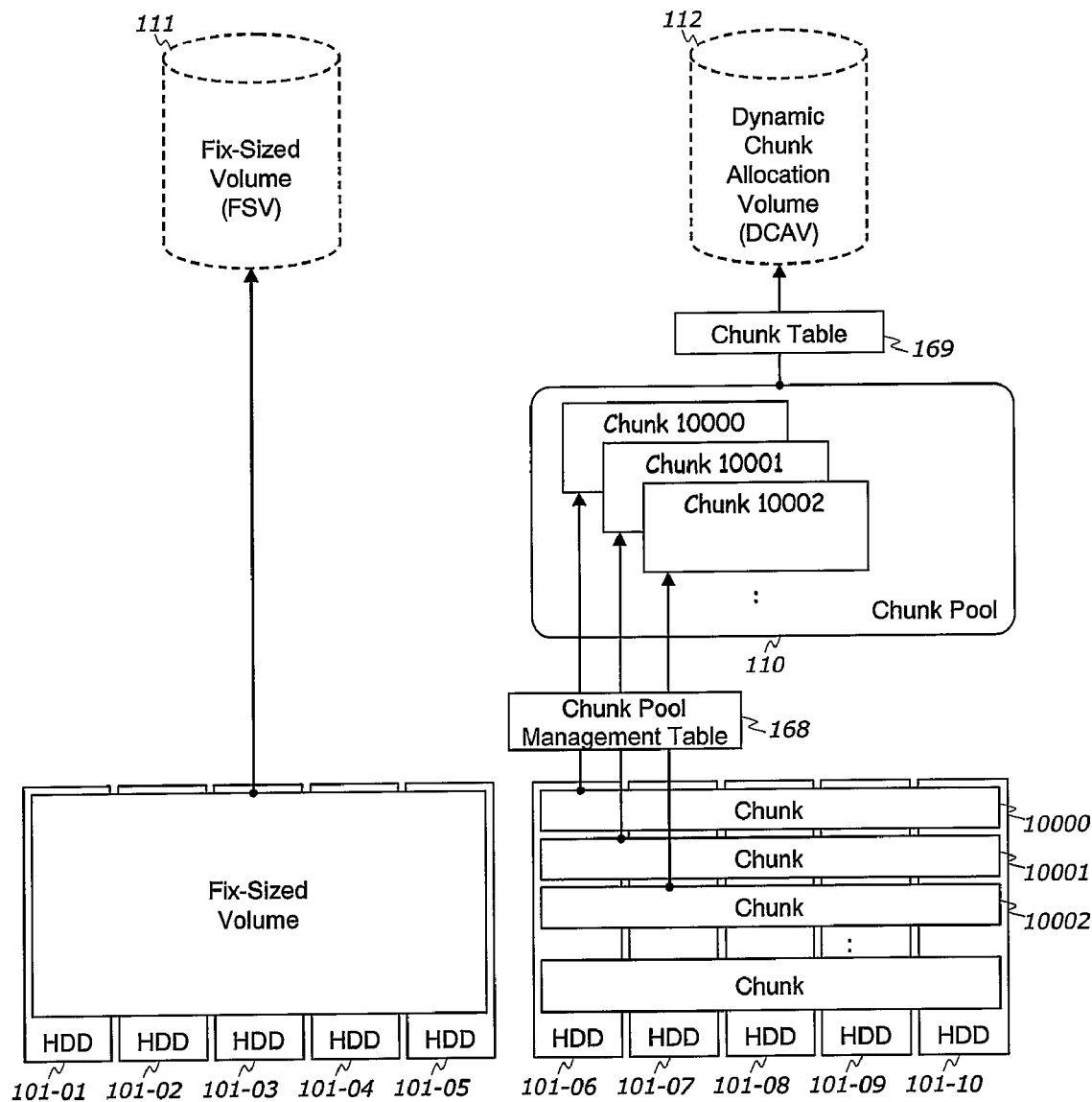
FIG. 8 illustrates an exemplary embodiment of a volume and HDD mapping.

Volume and HDD Mapping:

FIG. 8 shows illustrative volume and HDD mapping in the described embodiment of the invention. In the shown example, the volume 111 is a fix-sized volume, which is composed of five HDDs: 101-01 to 101-05. The volume 112 is a dynamic chunk allocation volume. The chunks are provided from the chunk pool 110, which is composed of five HDDs 101, from 101-06 to 101-10. The volume allocation program 222 residing on the management computer 200 may issue a volume allocation request to the storage apparatus 100. In response to this request, the volume allocation program 164 residing on the storage apparatus 100 allocates a fix-sized volume or a dynamic chunk allocation volume of appropriate size.

Process Flow for Dynamic Chunk Allocation Volume:

Read Capacity Command:

As mentioned hereinabove, the volume 112 does not have any chunks initially allocated to it because the volume 112 is a dynamic chunk allocation volume. The host computer 10 can obtain capacity information for accessed dynamic chunk allocation volume from the storage apparatus 100. The response program 163 residing in memory 152 of the controller 150 returns the aforesaid capacity information to the host computer 10 in response to a READ CAPACITY command even if the volume has no allocated chunks. Therefore, the host computer 10 recognizes the volume 112 in the storage apparatus 100 as a storage volume having a predetermined specific size.

Figure 9:
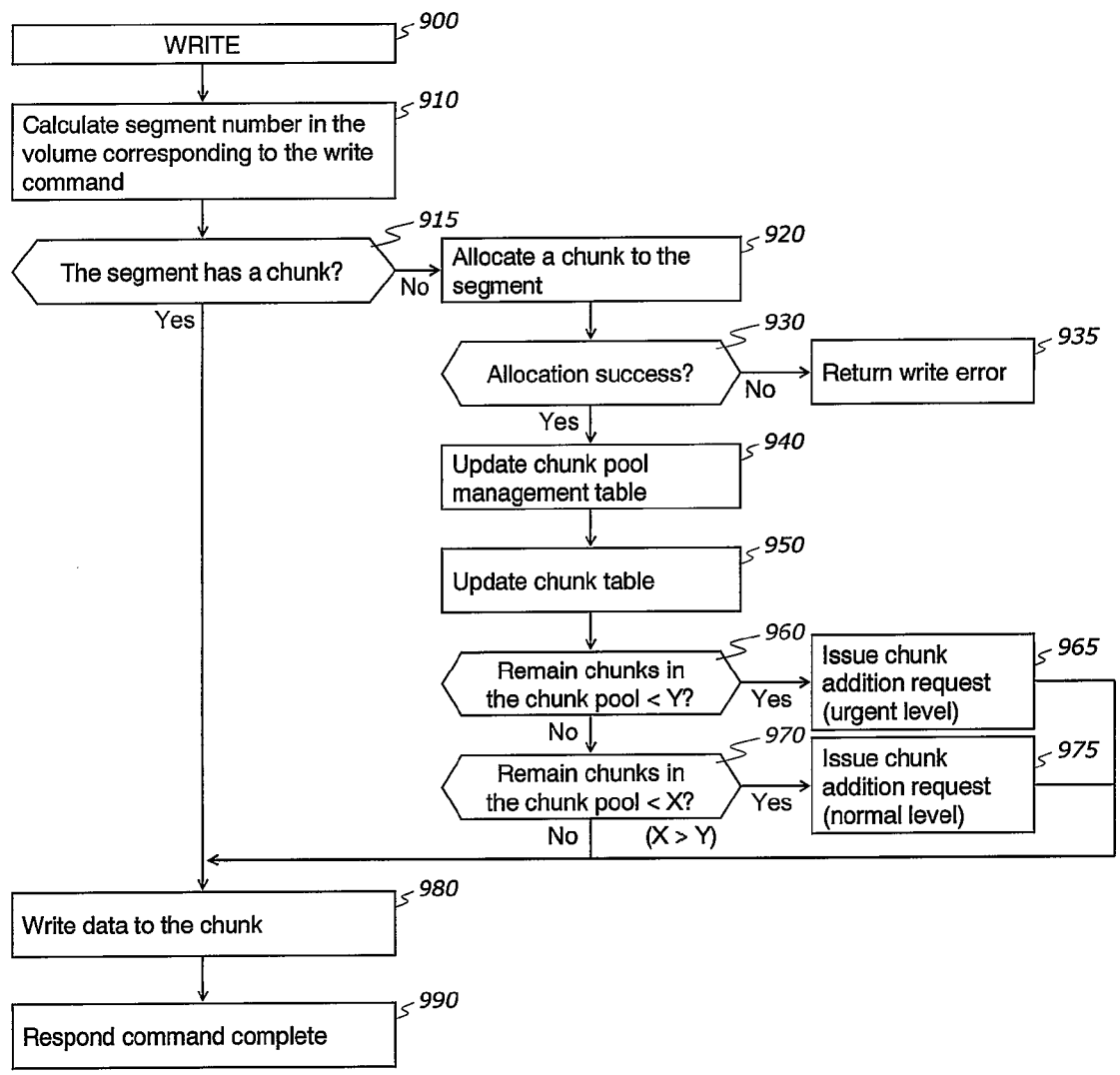
FIG. 9 illustrates an exemplary process flow in the response program 163 and the dynamic chunk allocation program 160.

Write Command:

The data write process is explained with reference to FIG. 9. Specifically, FIG. 9 illustrates an exemplary process flow performed by the response program 163 and the dynamic chunk allocation program 160 of the described embodiment of the inventive system in response to a received write command. The aforesaid process flow involves the following actions:

STEP 910: Segment number(s) in the volume corresponding to the write command are calculated.

STEP 915: Segment(s) are checked whether they already have chunk(s). If the segment(s) have chunk(s), the process flow proceeds to step 980.

STEP 920: Pickup a free chunk from the chunk pool and allocate the chunk to the segment.

STEP 930: Check if the chunk allocation operation has been successful. If the chunk allocation is failed, proceed to step 935.

STEP 935: Report write error to the host computer.

STEP 940: Update chunk pool management table.

STEP 950: Update chunk table.

STEP 960: Check number of remaining chunks in the chunk pool. If the remains are less than Y (here Y<X), proceed to step 965.

STEP 965: Issue chunk addition request with urgent level to the storage on demand management program 521 on the centralized management computer 500.

STEP 970: Check the number of remaining chunks in the chunk pool. If this number is less than a predetermined number X, proceed to step 975.

STEP 975: Issue a chunk addition request with normal level to the storage on demand management program 521.

STEP 980: Write data to the chunk allocated to the segment.

STEP 990: Signal the completion of the write command.

Figure 10:
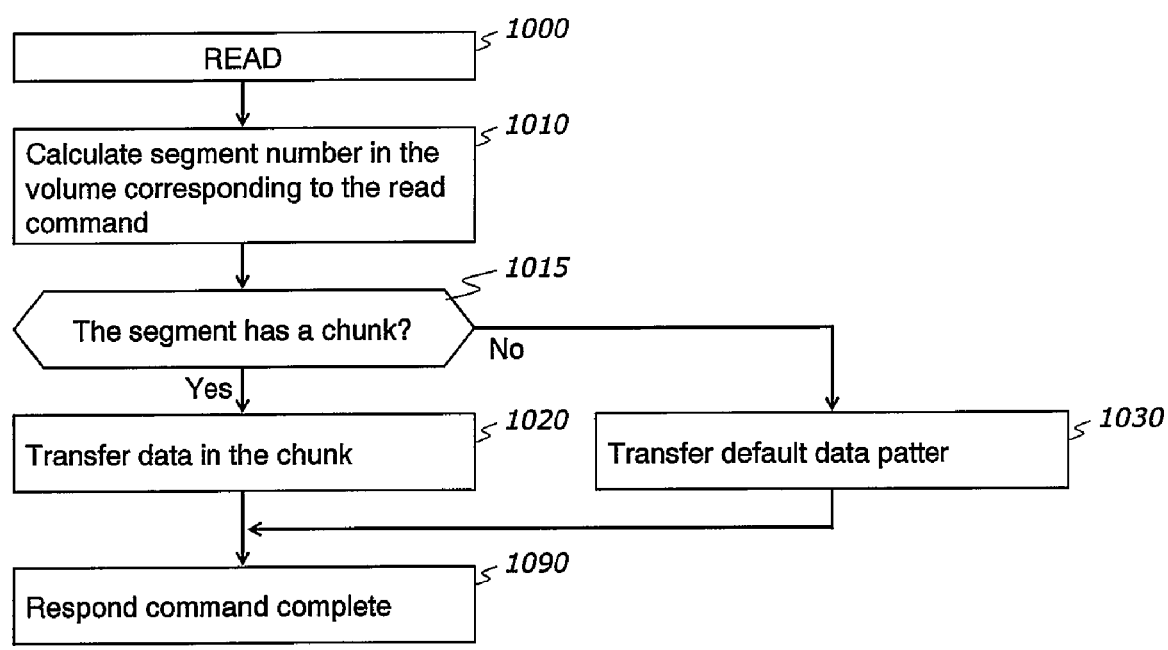
FIG. 10 illustrates an exemplary process flow in the response program 163.

Read Command:

The read process is explained with reference to FIG. 10. Specifically, FIG. 10 illustrates an exemplary process flow performed by the response program 163.

STEP 1010: Calculate segment number(s) in the volume corresponding to the read command.

STEP 1015: Check if the segment(s) already have a chunk. If the segment(s) already have a chunk, proceed to step 1020. If the segment(s) have no chunk, proceed to step 1030.

STEP 1020: Return data in the chunk allocated to the segment.

STEP 1030: Return default data pattern. Exemplary default data patterns transferred in this step include all zeros, all 0×FF and the like.

STEP 1090: Signal the completion of the respond command.

Storage On Demand Management Program:

As mentioned above, the chunk pool management program 165 issues the chunk addition request to the storage on demand management program 521 on the centralized management computer 500. The storage on demand management program 521 stores the chunk addition request in the pending request table 529. FIG. 11(a) illustrated an exemplary embodiment of the pending request table 529. The shown embodiment of the pending request table 529 includes "Storage Number" column 52901 for storing storage number that storage issues in response to the chunk addition request; "Chunk Pool Number" column 52902 for storing chunk pool number representing the target chunk pool for addition; "Level" column 52903 for storing the request level (normal/urgent); "Fix-sized Volume" column 52904 for storing a request for fix-sized volume allocation and "Requested Number of HDDs" column 52905 for storing number of HDDs that the storage apparatus or the management computer has requested.

For example, if the volume 112 receives a large number of write commands directed to different storage locations thereof from the host computer 10b, and a large number of chunks are consequently allocated to the volume 112, the number of the remaining chunks in the chunk pool may fall below the aforesaid X threshold. In this case, the dynamic chunk allocation program 160 issues the described chunk addition request to the storage on demand management program 521. The storage on demand management program 521, in turn, updates the pending request table 529 as shown in FIG. 11(b).

The volume addition request program 221 residing on the management computer 200 can also issue the volume addition request to the storage on demand management program 521. When the storage volume 111 is about to be filled to its full capacity, the administrator will attempt to allocate a new volume to the host computer 10a by invoking the volume allocation program 222 residing on the management computer 200. If free HDDs exist in the open segment at the storage apparatus 100, the volume allocation program 222 can allocate a new volume to the storage apparatus 100. If no available free HDD exist in the open segment at the storage apparatus 100, the volume addition request program 221 issues the volume addition request to the storage on demand management program 521, which resides on the centralized management computer. FIG. 11(c) illustrates the pending request table 529 after the volume addition request program 221 issues such volume addition request to the storage on demand management program 521.

The storage on demand management program 521 periodically evaluates the pending request table, for example on 12 hour interval or 24 hour interval. If the number of the remaining extra HDDs in the storage apparatus 100 is less than the total number of HDDs requested in accordance with the requests in the pending request table, the storage on demand management program selects the requests stored in the pending request table according to the priority table 522 stored in the memory 520. In the embodiment of the pending request table shown FIG. 11(c), two requests are pending, one request for chunk addition and another one for a fixed-size volume addition. FIG. 12(a) illustrates an exemplary embodiment 522a of the priority table 522. The priority table 522a must be registered beforehand. According to the priority table 522a, one chunk addition request is selected because the chunk addition operation has higher priority than the fix-sized volume addition. The storage on demand management program 521 responds to the volume addition request with error code sent to the management computer 200 because no available HDD remains for volume allocation.

If the number of the remaining chunks in the chunk pool falls below a predetermined threshold Y, while the chunk allocation request is pending, the chunk pool management program 165 issues a chunk addition request having an urgent level to the storage on demand management program 521. The storage on demand management program 521 may start to provide the key to the storage apparatus for adding the chunks without awaiting the next evaluation timing.

The storage on demand management program 521 provides a key to the storage apparatus 100 in accordance with the request entries in the pending request table 529. FIG. 13 illustrates an exemplary embodiment of the key 1300. The key 1300 is generated from the master key table 550. The master key table 550 holds all keys which are assigned to the extra HDDs in the closed segment of the storage apparatus 100. Thus, the centralized management computer 500 holds information on keys for all extra HDDs in the storage apparatus 100. In addition to the key values, the key 1300 also holds chunk pool designation 110. FIG. 14 illustrates an exemplary embodiment of the master key table 550. The shown exemplary embodiment of the master key table 550 includes: a "Storage Number" column 55001 for storing storage apparatus identification number and an "HDD Number" column 55002 for storing HDD numbers identifying the HDDs in the closed segment when the storage apparatus 100 is shipped.

In addition, the master key table 550 incorporates a "Key" column 55003 for storing keys assigned to the extra HDDs; an "In Use" column 55004 for storing current HDD usage status and a "Purpose" column 55005 for storing the designated use purpose of the HDD. Specifically, an HDD may be used either in a chunk or in a fixed-sized volume.

Key Management Program:

The key management program 161 updates the key management table 167 according to the received key 1300, when the key management program 161 receives the key 1300. In the described embodiment of the invention, the key management table 167 is updated as show in FIG. 7(b). Upon the update, the extra HDDs 102-01 to 102-05 in the closed segment are placed in the open segment. When the key management table 167 is updated correctly, the key management program 161 indicates the successful completion status to the storage on demand management program 521. The storage on demand management program 521 updates the master key table 550 as shown in FIG. 14(b).

Next, the key management program 161 checks the value in the purpose column of the key 1300. If the value in the purpose column of the key indicates a volume addition, the key 1300 is passed to the volume allocation program 164. The volume allocation program 164 notifies the management computer 200 of an HDD addition for fix-sized volume allocation purpose. If the value in the purpose column of the key indicates chunk addition, the key 1300 is passed to the chunk pool management program 165.

Figure 18:
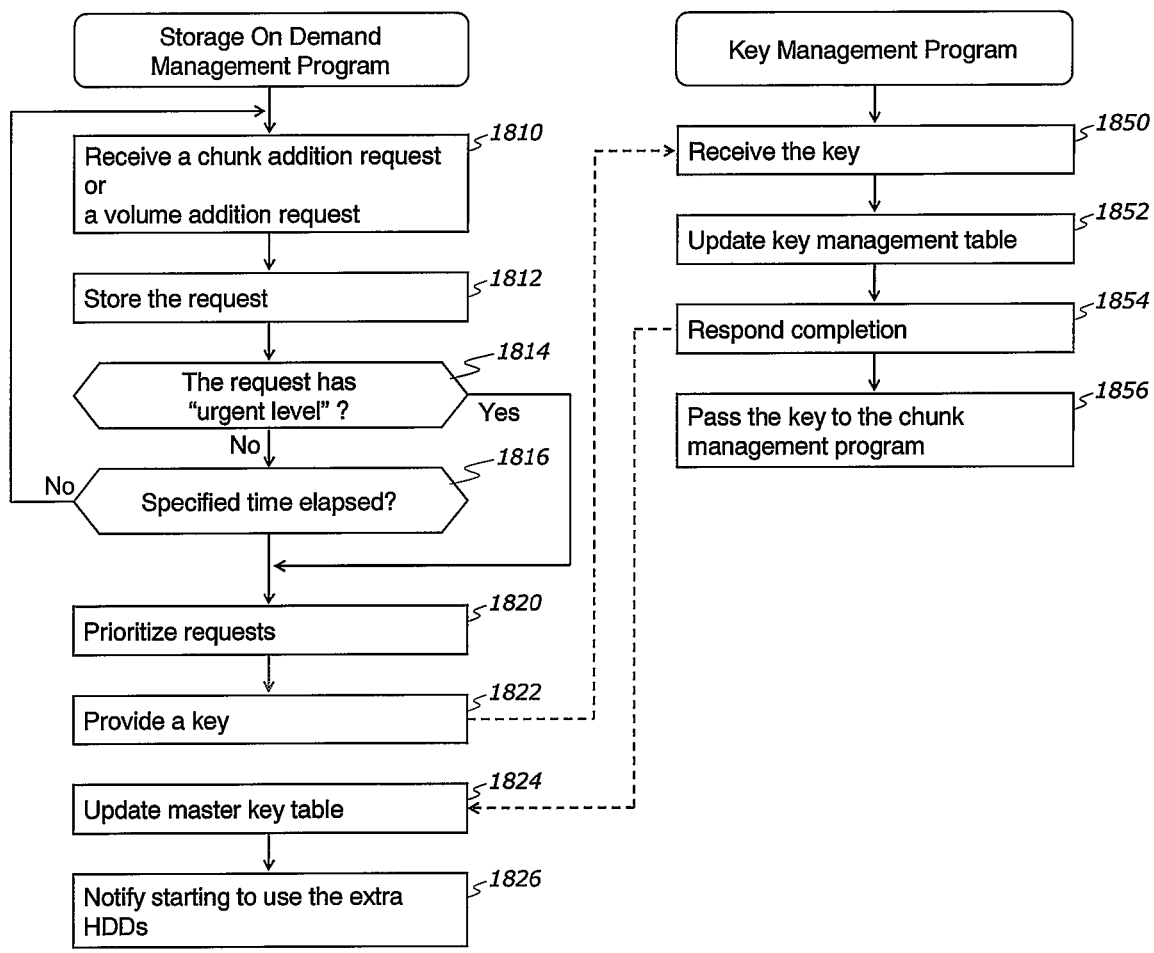
FIG. 18 illustrates an exemplary process flow of an embodiment of the invention.

Storage On Demand Management Program and Chunk Key Management Program Process Flows:

FIG. 18 illustrates an exemplary embodiment of a process flow mentioned hereinabove. Specifically, the storage on demand management program involves the following steps:

STEP 1810: Receive a chunk addition request or a volume addition request.

STEP 1812: Store the request to the pending request table 529.

STEP 1814: If the request has urgent level, proceed to step 1820.

STEP 1816: If specified time has elapsed (for example, 12 hours or 24 hours), proceed to step 1820. If not, proceed to step 1810.

STEP 1820: Prioritize the request in the pending request table according to the priority table.

STEP 1822: Provide a key to the key management program.

The described embodiment of the Key management program may involve the following steps:

STEP 1850: Receive the key.

STEP 1852: Update the key management table (the extra HDDs are placed in the open segment).

STEP 1854: Report completion.

STEP 1856: Pass the key to the chunk pool management program.

An exemplary embodiment of the storage on demand management program may include the following steps:

STEP 1824: Update the master key table 550.

STEP 1826: Notify starting to use the extra HDDs to the charge program 525. The charge program 525 records the usage of extra HDDs. The charge program 525 may issue the bill to owner of the storage apparatus.

Figure 15:
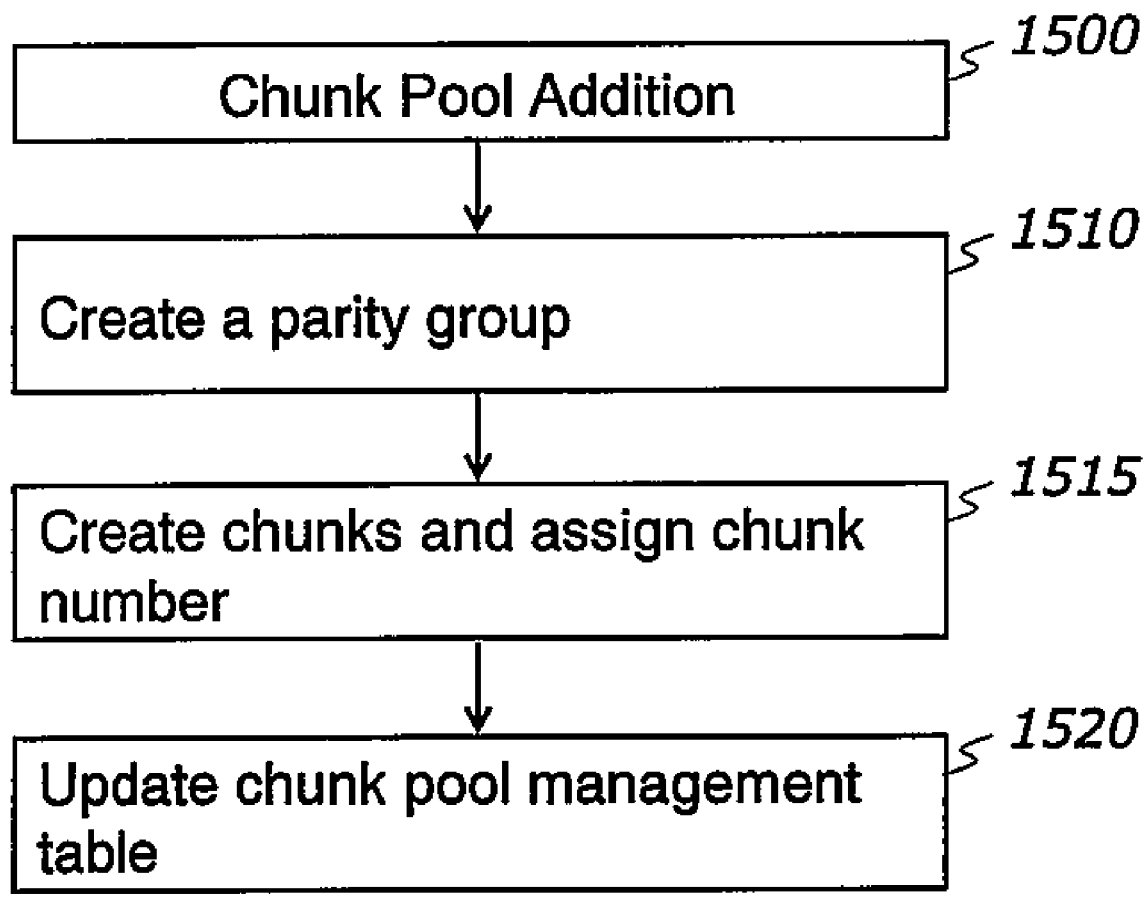
FIG. 15 illustrates an exemplary process flow of the chunk pool management program 165.

An exemplary embodiment of the Chunk Pool Management Program Process Flow will now be described. The chunk pool management program 165 creates chunks in the HDDs when the chunk pool management program 165 receives the key 1300. FIG. 15 shows process flow in the chunk pool management program 165.

STEP 1510: Create parity group. (parity group: data is stripped into parity group and guarded from HDD failure by redundant data; parity information.)

STEP 1515: Divide the parity group into chunks and assign chunk number

STEP 1520: Update the chunk pool management table (updated the chunk pool management table is shown in FIG. 5(b)).

As mentioned above, the new chunks are added to the chunk pool 110 without interruption of the operation of the management computer 200 or the host computer 10. If the extra HDDs were not provided in the storage apparatus 100 and the capacity on demand sequence were not enabled, it would take much longer time to add chunks than the time required to do so in accordance with the described embodiment of the invention, because HDDs would have to be delivered physically. Thus, in the system relying on physical delivery of the HDDs, the value of the threshold "X" must be set fairly high in order to ensure that the HDDs would be delivered by the time that storage resources are fully consumed. Because of the high threshold value, such system would have a low storage capacity utilization in comparison with the described embodiment.

Chunk Pool Reporting Program:

The storage controller module 150 may execute the chunk pool reporting program 166. The chunk reporting program 166 periodically reports the number of remaining chunks in the pool to the storage on demand management program 521. FIG. 16 illustrates an exemplary embodiment of a chunk pool report 1600. Storage number, pool number and number of remaining chunks are reported in the aforesaid chunk pool report 1600.

The storage on demand management program 521 records the reports received from various storage apparatuses in the system. The storage on demand management program 521 may record such received reports in a log file. In addition, the storage on demand management program 521 can calculate chunk consumption rate at each chunk pool. For example, FIG. 17 illustrates an exemplary chunk pool log. The shown chunk pool log incorporates: a "Storage Number" column 170001 for storing storage number; a "Pool Number" column 170002 for storing pool number; a "Time Stamp" column 170003 for storing time when the storage on demand management program receives the chunk pool report 1600. In addition, the exemplary chunk pool log may include a "Remaining Chunks" column 170004 for storing number of remaining chunks, which is reported by the chunk pool report 1600 as well as a "Consumption Rate" column 170005 for storing calculated consumption rate. In one embodiment of the invention, a daily chunk consumption rate is calculated. In other embodiment, hourly, weekly or monthly rates may be similarly determined.

The storage on demand management program 521 may provide the key to the storage apparatus for adding the chunks without receiving a request from the storage apparatus if the storage on demand management program 521 detects the low number of remaining chunks in the chunk pool as indicated by the chunk pool report and/or the chunk pool log.

Multiple Chunk Pool Configuration:

If the storage apparatus 100 has multiple chunk pools (for example: 110-01 and 110-02), the extra HDD may be associated to specific chunk pool by pre-defined priority. The pre-defined priority must be registered in the storage apparatus 100 or the centralized management computer 500 in advance. For example, in this case, the priority table 552 may be extended as shown in FIG. 12(b).

Second Embodiment

Hierarchical System Configuration

Figure 19:
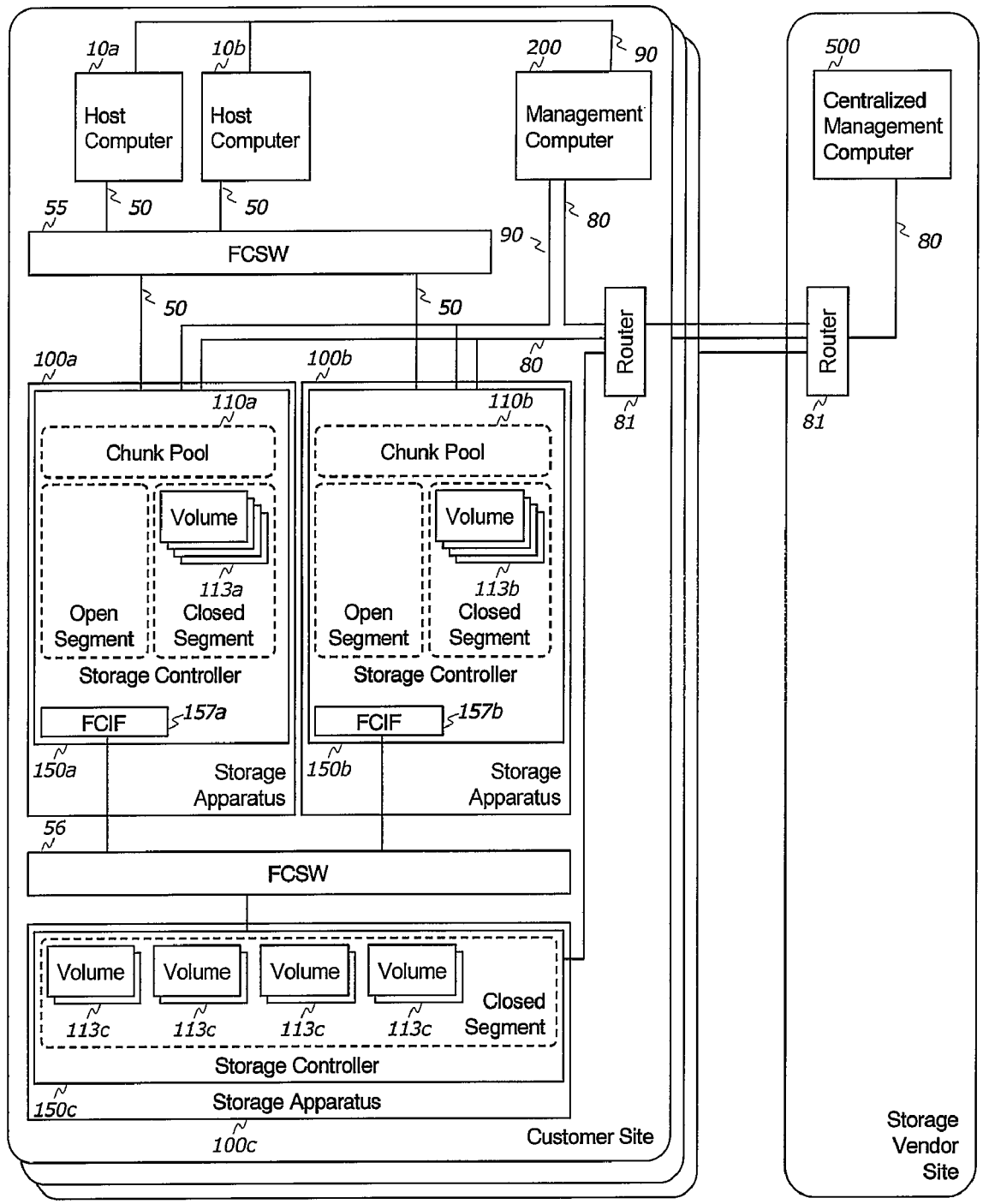
FIG. 19 illustrates an exemplary embodiment of an information system in which the method of this invention can be applied.

FIG. 19 illustrates an exemplary embodiment of the information system in which another method of this invention can be applied. The description below will emphasize the differences between the first embodiment described above and the second embodiment. Specifically, in the second embodiment of the inventive system, two more storage apparatuses 100b and 100c are provided in addition to the storage apparatus 100a of the first embodiment, see FIG. 19. These three storage apparatuses are interconnected by a Fibre Channel switch 56, see FIG. 19. To this end, the storage apparatus 100a is provided with the FCIF 157a for connecting it to the other storage apparatuses. Likewise, the storage apparatus 100b is provide with the FCIF 157b connected to the Fibre Channel switch 56. Thus, the two storage apparatuses 100a and 100b are connected to the storage apparatus 100c via the FCSW 56.

In the second embodiment, the storage apparatus 100a incorporates multiple volumes 113a in the closed segment (the volumes 113a are created on the HDDs), while the storage apparatus 100b incorporates multiple volumes 113b in the closed segment (the volumes 113b are created on the HDDs). The storage apparatus 100c includes multiple volumes 113c in the closed segment (the volumes 113c are created on the HDDs).

Also in the second embodiment, the storage apparatus 100a executes a mount program 162a, while the storage apparatus 100b executes a mount program 162b. Also provided is Fibre Channel switch (FCSW) 56 for interconnecting the storage apparatuses. It should be noted that in the first embodiment, the chunks are created using multiple HDDs. In the second embodiment, on the other hand, the chunks are created using one or more volumes. The volumes of the second embodiment, are created, in turn, using multiple HDDs.

Volumes in Closed Segment:

Volumes 113 in the closed segment in the storage apparatuses 100a and 100b are concealed by the secret keys as described hereinabove. The storage controller 150 does not reveal the volume 113 until the key is provided by the storage on demand management program 521. An exemplary implementation of the key management table 167c in this embodiment of the invention is shown in FIG. 20. The illustrated key management table 167c is composed of: a "Volume Number" column 16711 for storing a volume number identifying a volume; a "Hidden Key" column 16712 for storing a hidden key. The aforesaid Hidden Key is provided when the specific volume is shipped with the storage apparatus 100c. The key management table 167c further includes a "Provided Key" column 16713 for storing a key provided from the centralized management computer via the management network and a "Storage Number" column 16714 for storing a storage number, which identifies the consumer of the volume.

Master Key Table:

An exemplary implementation of the master key table 550 in the second embodiment is shown in FIG. 21. The illustrated master key table 550 in this embodiment incorporates a "Storage Number" column 55011 for storing the storage number; a "Volume Number" column 55012 for storing the volume number for each volume located in the in the closed segment upon the initial shipment of the storage apparatus. The master key table 550 further includes a "Key" column 55013 for storing keys assigned to the volumes and "In Use" column 55014 for storing the current usage status of the respective volume.

Storage On Demand Management Program:

As it was mentioned in the description of the first embodiment, the chunk pool management program 165 issues the chunk addition request to the storage on demand management program 521. Also, the chunk pool reporting program 166 periodically reports the number of remaining chunks in the pool to the storage on demand management program 521. In the second embodiment, the two storage apparatuses 100a and 100b issue the aforesaid chunk addition requests independently. The storage on demand management program 521 places each chunk addition request in the pending request table 529. The storage on demand management program 521 periodically evaluates the entries in this pending request table.

In the second embodiment, the embodiment of the priority table 522c shown in FIG. 12(c) is used. This priority table 522c must be registered beforehand. According to the shown implementation of the priority table 522c, the storage on demand management program 521 first attempts to allocate new chunks from volumes in the closed segment in the same storage apparatus, when the storage on demand management program 521 receives the chunk addition request. If no available volume exists in the same storage apparatus, the storage on demand management program 521 attempts to allocate a new chunk from the volumes 113c in the storage apparatus 100c. The storage on demand management program 521 provides a key according to the priority table 522.

When Chunk Pool 110a Requires Additional Chunk:

When the chunk pool management program 165a issues the chunk addition request and a there exists an available volume in the closed segment in the storage apparatus 100a, the storage on demand management program 521 provides a key according to the priority table 522 and the master key table. In the described scenario, the key is provided to the storage apparatus 100a.

Upon the receipt of the key by the key management program 161a, the key management program 161a updates the key management table 167a according to the received key. Once the hidden key matches the provided key, the volume is enabled. After that, the key management program 161a reports a successful completion to the storage on demand management program 521. The chunk pool management program 165a creates chunks using the volumes that became available. Thereafter, the chunk pool management table is updated.

Now, the situation when the Chunk Pool 110b requires an additional chunk will be described. When the chunk pool management program 165b issues the chunk addition request and no volume in the closed segment in the storage apparatus 100b exists, the storage on demand management program 521 provides a key according to the priority table 522 and the master key table. In this case, the key is provided to the storage apparatus 100c, because no volume exists in the storage apparatus 100b.

Upon the receipt of the key by the key management program 161c, the key management program 161c in the storage apparatus 100c updates the key management table 167c according to the received key. Once the hidden key matches the provided key, the hidden volume is enabled. After that, the key management program 161c reports successful completion of the operation to the storage on demand management program 521.

Next, the storage on demand management program 521 issues a mount request with a specific volume number and a storage number to the mount program 162b in the storage apparatus 100b. The mount program 162b mounts the volume according to the mount request. After volume mount is finished, the chunk pool management program 165b creates chunks in the mounted volume. After that, the chunk pool management table is updated.

Adding HDDs to Storage Apparatus:

Multiple HDDs may be added to the storage apparatus 100b because the storage apparatus 100b is using volumes on the storages apparatus 100c. Data on the chunks in the storage apparatus 100c are migrated to the new chunks which are made on HDDs added. The chunk pool management program 165 creates chunks on the new HDDs when the chunk pool management program 165 detects new HDDs. Then the chunk pool management program 165 migrates the data to chunks in the storage apparatus 100b. Eventually the chunks on the volume which is in the storage apparatus 100c become no data. The mount program 162b unmounts the volume if the volume has no chunk with data. The chunk pool management program 165b issues a volume return request to the storage on demand management program 521. The storage on demand management program 521 withdraws the key from the storage apparatus 100c. The volume withdrawn the key is placed in the closed segment again.

Now, the operation of the inventive system when two chunk addition requests received at the same time will be described. In case of multiple chunk addition requests that are received at the same evaluation time frame at the storage on demand management program 521, the storage on demand management program 521 evaluates the daily chunk consumption rate. The chunk pool with higher consumption rate is prioritized for issuing the key. The storage on demand management program 521 may provide multiple keys for allocating multiple volume at once to the chunk pool with higher consumption rate.

Figure 22:
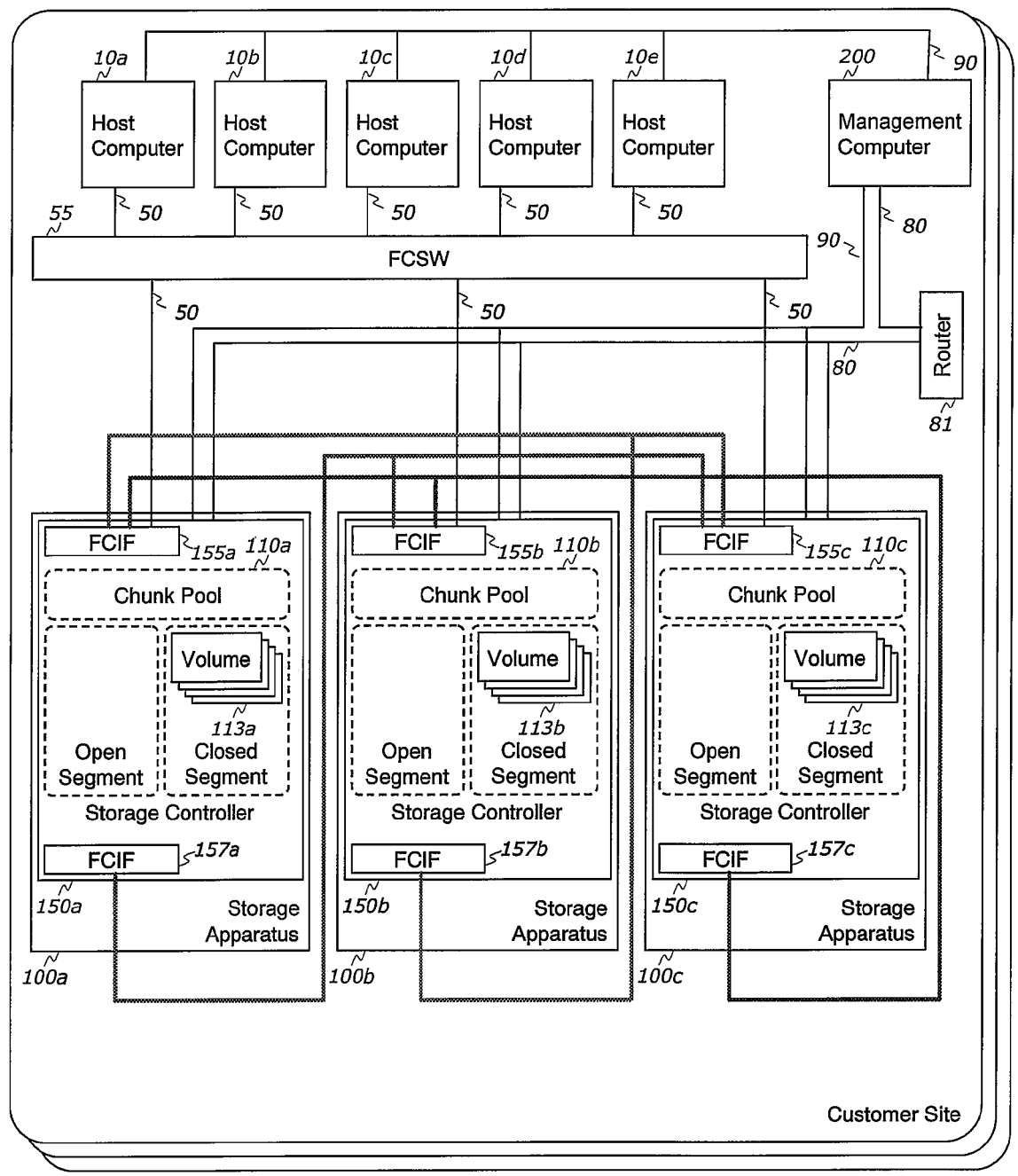
FIG. 22 illustrates another exemplary embodiment of an information system in which the method of this invention can be applied.

Horizontal System Configuration:

FIG. 22 illustrates yet another exemplary embodiment of the information system in which another method of this invention can be applied. In this configuration, the storage apparatuses 100a, 100b and 100c are interconnected via the FCIF 157.

Priority Table:

The priority table 522d in this embodiment is shown in FIG. 12(d).

Master Key Table:

The master key table 550 of the third embodiment is shown in FIG. 21. This master key table is the same as in the second embodiment.

In the Case of the Chunk Pool 110a Needs Additional Chunk:

When the chunk pool management program 165a issues the chunk addition request and free volume in the closed segment in the storage apparatus 100a exists, the storage on demand management program 521 provides a key according to the priority table 522 and the master key table. In this case, the key is provided to the storage apparatus 100a.

In the Case of the Chunk Pool 110b Needs the Additional Chunk:

In the case of the chunk pool management program 165b issues the chunk addition request and no volume in the closed segment in the storage apparatus 100b exists, the storage on demand management program 521 provides a key according to the priority table 550 and the master key table. Also the storage on demand management program 521 may evaluates remaining capacity in the closed segment and the chunk consumption rate at the other storage apparatuses 100a and 100c. For example a storage apparatus with the largest remaining capacity in the closed segment and the lowest chunk consumption rate is selected by the storage on demand management program 521.

Figure 26:
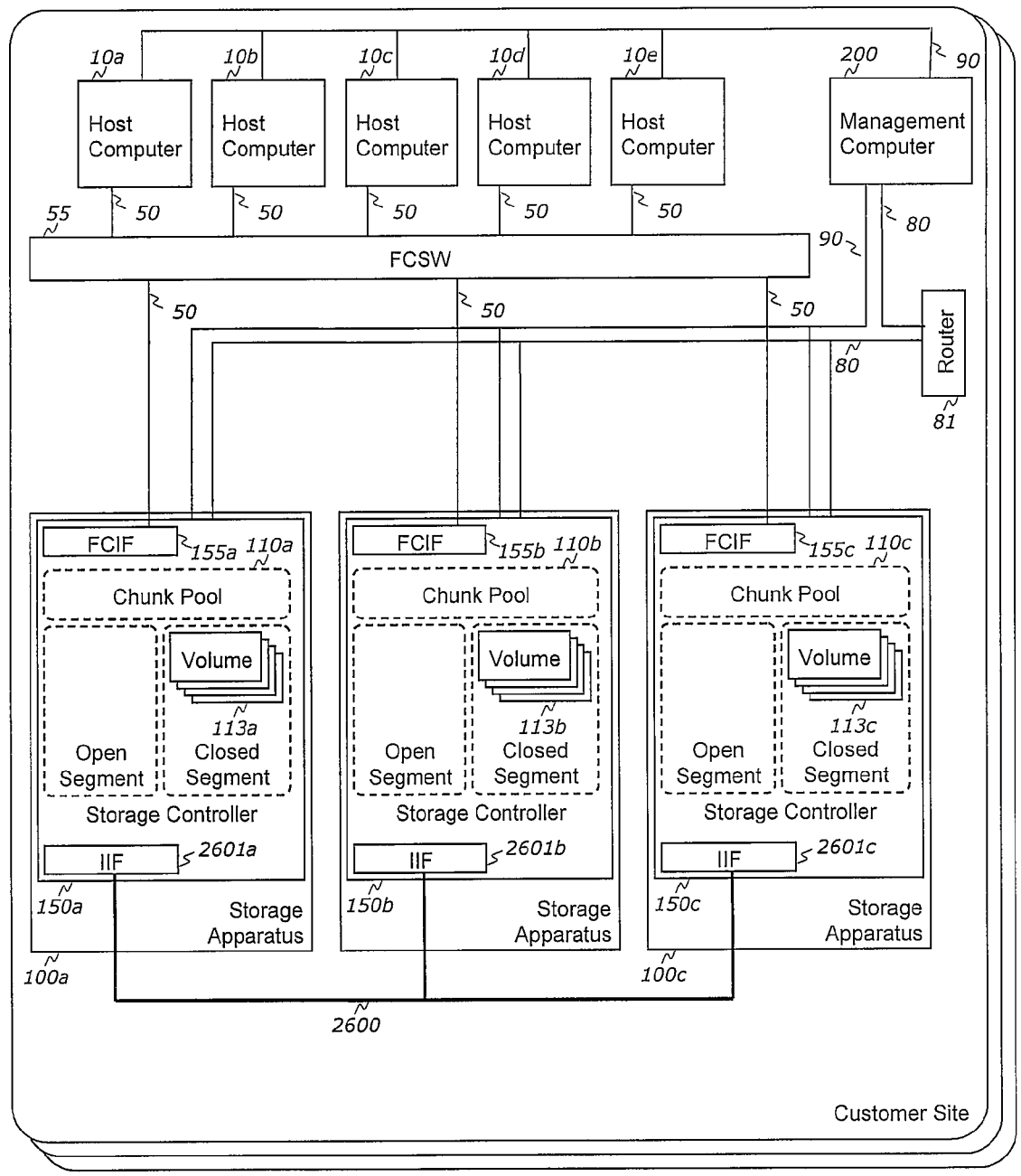
FIG. 26 illustrates another exemplary embodiment of an information system in which the method of this invention can be applied.

Horizontal System Configuration (Internal Connection):

FIG. 26 illustrates another exemplary embodiment of the information system in which the method of the invention can be applied. In this configuration, the storage apparatuses 100a, 100b and 100c are interconnected via the interconnect 2600. The storage apparatus 100a, 100b and 100c each have interface board 2601 (IIF 2601) for coupling to the interconnect 2600. Infiniband, Ethernet, as well as other suitable connection technologies, including proprietary connections, can be used for implementing the interconnect 2600.

Third Embodiment

System Configuration

Figure 23:
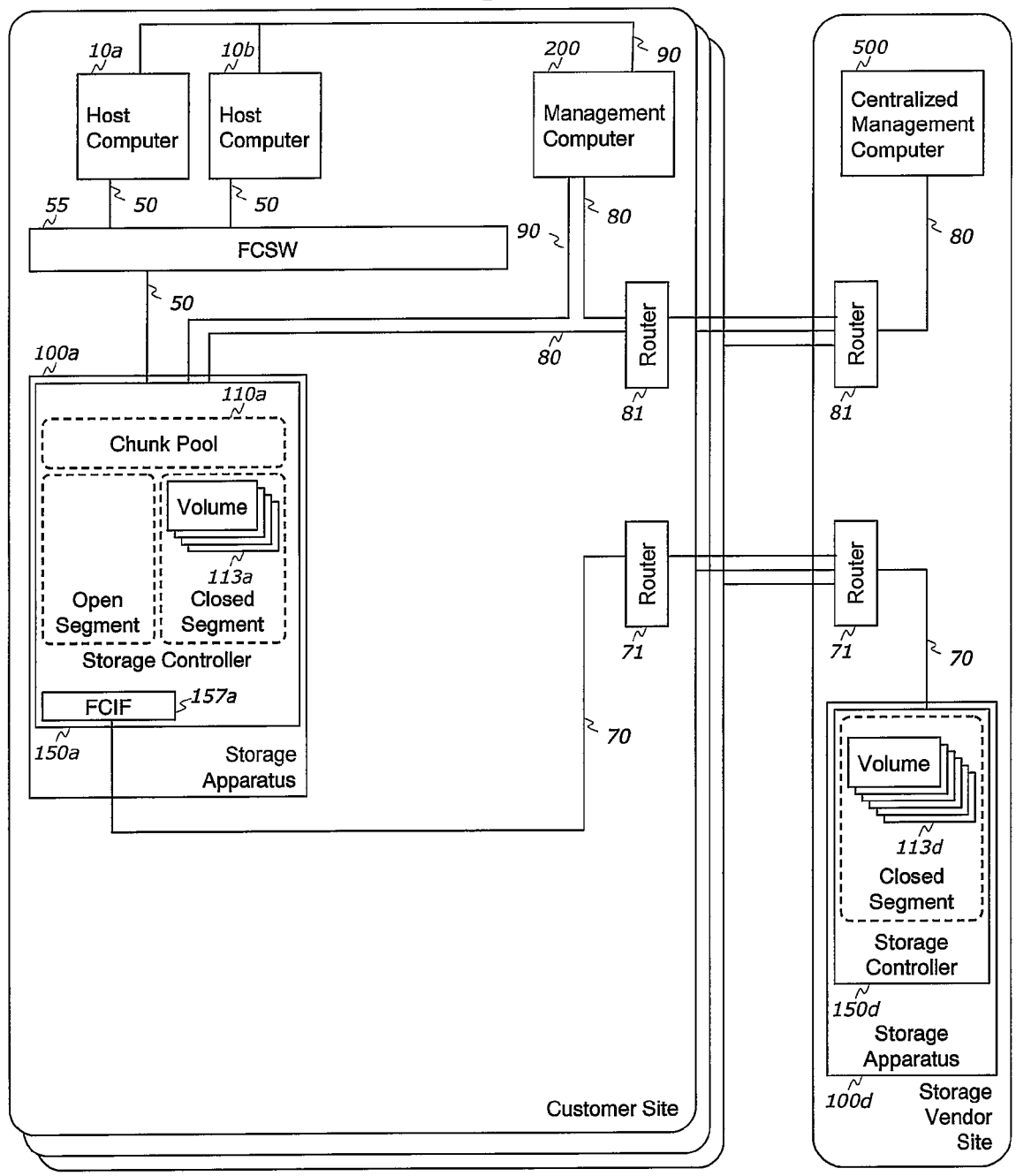
FIG. 23 illustrates another exemplary embodiment of an information system in which the method of this invention can be applied.

FIG. 23 illustrates yet another exemplary embodiment of the information system in which the method of this invention can be applied. The difference between the second embodiment and the third embodiment will now be described in detail. Specifically, in the third embodiment, a storage apparatus 100d is located at the storage vendor site and not at the customer site as in the second embodiment. A remote data network 70 is provided for interconnecting the storage apparatus 100a in the customer site and the storage apparatus 100d in the storage vendor site. The remote data network 70 in the third embodiment is implemented using the Fibre Channel technology. However, the inventive concept is not limited to any specific networking system and other network interfaces, such as Ethernet and the like, can also be utilized.

To enable the remote data network 70, in the third embodiment, the two routers 71 are used. Also in the third embodiment, the storage apparatus 100a has a request key. The request key is provided to the storage apparatus 100a when the storage apparatus 100a is shipped by the storage vendor. The request key is used for requesting storage volumes located at the storage vendor site. An exemplary request key is illustrated in FIG. 24. As shown in FIG. 24, the request key includes a chunk pool number 110*a* and the corresponding key (aaaxxx in FIG. 24).

Master Key Table:

The master key table is registered in advance. The master key table in the third embodiment of the invention is illustrated in FIG. 25. The volumes incorporated in the storage apparatus 100*d*, which is located at the storage vendor site are provided if the request key matches the corresponding record in the master key table. It should be noted that the maximum capacity of the volume may be limited by the "Capacity Limit" column in the master key table.

Priority Table:

An exemplary implementation of the priority table for this embodiment is shown in FIG. 12(*e*) and FIG. 12(*f*). In this embodiment, there are two priority tables. The priority table 522*e* shown in FIG. 12(*e*) is used for controlling volume allocation priority in the storage apparatus 100*a*. The priority table 522*f* shown in FIG. 12(*f*) is used for controlling priority in the case of multiple chunk addition requests are received at same evaluation time frame at the storage on demand management program 521.

When Chunk Pool 110*a* Needs the Additional Chunk:

In the case of the chunk pool management program 165*a* issues the chunk addition request with the request key and no volume in the closed segment in the storage apparatus 100*a* exists, the storage on demand management program 521 prepares a volume in the storage apparatus 100*d* if the request key matches the master key table, and the storage on demand management program 521 issues a mount request with the volume number and the storage number to the mount program 162*a* in the storage apparatus 100*a*. The mount program 162*a* mounts the volume according to the mount request. After volume mount is finished, the chunk pool management program 165*a* create chunks in the volumes mounted. The chunk pool management table is updated.

Volume Size:

The storage on demand management program 521 calculates capacity of the volume when the volume is allocated. The volume in the storage apparatus 100*d* should be temporary. The storage on demand management program 521 calculates the capacity according to the chunk consumption rate and HDD delivery latency. For example, the chunk consumption rate is 1000 chunks per day, 2 MB per chunk, 10 days HDD delivery time, 20 GB (=1000×2 MB×10) is allocated to the chunk pool 110*a*.

Adding HDDs to the Storage Apparatus 100*a*

In this embodiment, multiple HDDs must be added in 10 days. Data on the chunks in the storage apparatus 100*d* are migrated to the new chunks which are mode on HDDs added. The chunk pool management program 165 creates chunks on the new HDDs when the chunk pool management program 165 detects new HDDs. Then the chunk pool management program 165 migrates the data to chunks in the storage apparatus 100*a*. Eventually the chunks on the volume which is in the storage apparatus 100*d* becomes no data. The mount program 162*a* unmounts the volume. The chunk pool management program 165*a* issues a volume return request to the storage on demand management program 521. The storage on demand program 521 withdraws the volume.

It should be noted that instead of adding new HDDs to the storage apparatuses, a new storage apparatus may be added to the system. The newly added storage apparatus may be connected to the existing storage apparatus 100*a* via the FCIF 157*a*. The so added storage apparatus provides volumes, which can be used for adding chunks. Also, when multiple chunk addition requests are received at the same evaluation time frame at the storage on demand management program 521, the storage on demand management program 521 evaluates the priority table 522*f* to determine the priority for handling the received requests.

The charge program 525 records the rental capacity and the rental term (in this embodiment, 20 GB and 10 days for example). The charge program 525 may issue the bill based on the rental capacity and the rental term to the owner of the storage apparatus. It should be noted that the storage apparatus 100*a* may be configured without volumes in the closed segment.

Figure 27:
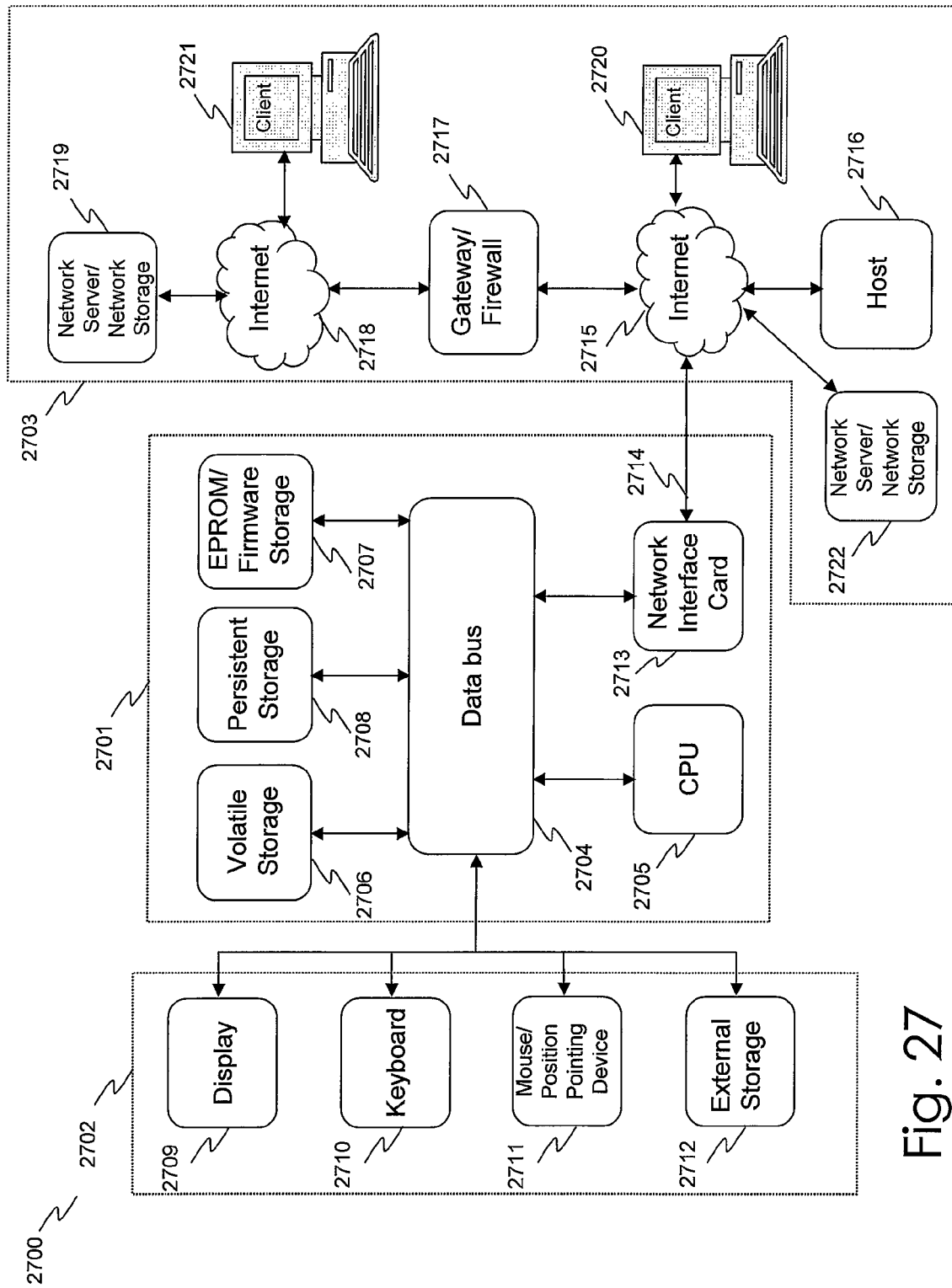
FIG. 27 illustrates an exemplary embodiment of a computer platform upon which the inventive system may be implemented.

Exemplary Implementation of Computer Platform:

FIG. 27 is a block diagram that illustrates an embodiment of a computer/server system 2700 upon which an embodiment of the inventive methodology may be implemented. The system 2700 includes a computer/server platform 2701, peripheral devices 2702 and network resources 2703.

The computer platform 2701 may include a data bus 2704 or other communication mechanism for communicating information across and among various parts of the computer platform 2701, and a processor 2705 coupled with bus 2701 for processing information and performing other computational and control tasks. Computer platform 2701 also includes a volatile storage 2706, such as a random access memory (RAM) or other dynamic storage device, coupled to bus 2704 for storing various information as well as instructions to be executed by processor 2705. The volatile storage 2706 also may be used for storing temporary variables or other intermediate information during execution of instructions by processor 2705. Computer platform 2701 may further include a read only memory (ROM or EPROM) 2707 or other static storage device coupled to bus 2704 for storing static information and instructions for processor 2705, such as basic input-output system (BIOS), as well as various system configuration parameters. A persistent storage device 2708, such as a magnetic disk, optical disk, or solid-state flash memory device is provided and coupled to bus 2701 for storing information and instructions.

Computer platform 2701 may be coupled via bus 2704 to a display 2709, such as a cathode ray tube (CRT), plasma display, or a liquid crystal display (LCD), for displaying information to a system administrator or user of the computer platform 2701. An input device 2710, including alphanumeric and other keys, is coupled to bus 2701 for communicating information and command selections to processor 2705. Another type of user input device is cursor control device 2711, such as a mouse, a trackball, or cursor direction keys for communicating direction information and command selections to processor 2704 and for controlling cursor movement on display 2709. This input device typically has two degrees of freedom in two axes, a first axis (e.g., x) and a second axis (e.g., y), that allows the device to specify positions in a plane.

An external storage device 2712 may be connected to the computer platform 2701 via bus 2704 to provide an extra or removable storage capacity for the computer platform 2701. In an embodiment of the computer system 2700, the external removable storage device 2712 may be used to facilitate exchange of data with other computer systems.

The invention is related to the use of computer system 2700 for implementing the techniques described herein. In an embodiment, the inventive system may reside on a machine such as computer platform 2701. According to one embodiment of the invention, the techniques described herein are performed by computer system 2700 in response to processor 2705 executing one or more sequences of one or more instructions contained in the volatile memory 2706. Such instructions may be read into volatile memory 2706 from another computer-readable medium, such as persistent storage device 2708. Execution of the sequences of instructions contained in the volatile memory 2706 causes processor 2705 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2705 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 2708. Volatile media includes dynamic memory, such as volatile storage 2706. Transmission media includes coaxial cables, copper wire and fiber optics, including the wires that comprise data bus 2704. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 2705 for execution. For example, the instructions may initially be carried on a magnetic disk from a remote computer. Alternatively, a remote computer can load the instructions into its dynamic memory and send the instructions over a telephone line using a modem. A modem local to computer system 2700 can receive the data on the telephone line and use an infra-red transmitter to convert the data to an infra-red signal. An infra-red detector can receive the data carried in the infra-red signal and appropriate circuitry can place the data on the data bus 2704. The bus 2704 carries the data to the volatile storage 2706, from which processor 2705 retrieves and executes the instructions. The instructions received by the volatile memory 2706 may optionally be stored on persistent storage device 2708 either before or after execution by processor 2705. The instructions may also be downloaded into the computer platform 2701 via Internet using a variety of network data communication protocols well known in the art.

The computer platform 2701 also includes a communication interface, such as network interface card 2713 coupled to the data bus 2704. Communication interface 2713 provides a two-way data communication coupling to a network link 2714 that is connected to a local network 2715. For example, communication interface 2713 may be an integrated services digital network (ISDN) card or a modem to provide a data communication connection to a corresponding type of telephone line. As another example, communication interface 2713 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2713 sends and receives electrical, electromagnetic or optical signals that carry digital data streams representing various types of information.

Network link 2713 typically provides data communication through one or more networks to other network resources. For example, network link 2714 may provide a connection through local network 2715 to a host computer 2716, or a network storage/server 2717. Additionally or alternatively, the network link 2713 may connect through gateway/firewall 2717 to the wide-area or global network 2718, such as an Internet. Thus, the computer platform 2701 can access network resources located anywhere on the Internet 2718, such as a remote network storage/server 2719. On the other hand, the computer platform 2701 may also be accessed by clients located anywhere on the local area network 2715 and/or the Internet 2718. The network clients 2720 and 2721 may themselves be implemented based on the computer platform similar to the platform 2701.

Local network 2715 and the Internet 2718 both use electrical, electromagnetic or optical signals that carry digital data streams. The signals through the various networks and the signals on network link 2714 and through communication interface 2713, which carry the digital data to and from computer platform 2701, are exemplary forms of carrier waves transporting the information.

Computer platform 2701 can send messages and receive data, including program code, through the variety of network (s) including Internet 2718 and LAN 2715, network link 2714 and communication interface 2713. In the Internet example, when the system 2701 acts as a network server, it might transmit a requested code or data for an application program running on client(s) 2720 and/or 2721 through Internet 2718, gateway/firewall 2717, local area network 2715 and communication interface 2713. Similarly, it may receive code from other network resources.

The received code may be executed by processor 2705 as it is received, and/or stored in persistent or volatile storage devices 2708 and 2706, respectively, or other non-volatile storage for later execution. In this manner, computer system 2701 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with dynamic chunk allocation capability. It is intended that the specification and examples be considered as exemplary only, with a true scope and spirit of the invention being indicated by the following claims.

What is claimed is:

1. A data storage system comprising:
   a. a storage controller to manage at least one dynamic volume having chunks allocated from a pool according to a write request position and a chunk allocation status;
   b. at least one first storage area available for data storage and to be allocated to the pool;
   c. at least one second storage area not available for data storage and secured by a key;
   d. a networking interface to communicate with a storage on demand management system, wherein:
      i. the storage controller is to issue a storage area addition request to the storage on demand management system when a number of unused chunks in the pool falls below a predetermined threshold,
      ii. the storage controller is to receive from the storage on demand management system the key and use the received key to cause the at least one second storage area to become available for data storage,
      iii. the storage controller is to establish relations between the pool and the second storage area,
      iv. the storage controller is to divide the second storage area into chunks,
      v. the storage controller is to allocate the chunks in the second storage area to the dynamic volume; and
      vi. the storage controller is to unmount the dynamic volume if the dynamic volume does not have chunks with data;
   wherein the second storage area is a hard disk drive; and wherein if the dynamic volume does not have chunks with data, the storage controller issues a request to the storage on demand management system such that the received key is withdrawn.

2. The data storage system of claim 1, wherein the storage on demand management system is to select whether the second storage area is to be allocated from the pool or the second storage area is added by a fixed-sized volume, the selection being based on preset information.

3. The data storage system of claim 1, wherein the second storage area is a storage volume; and wherein if the dynamic volume does not have chunks with data, the storage controller issues a request to the storage on demand management system such that the received key is withdrawn.

4. The data storage system of claim 1, wherein the storage controller is further to issue to the storage on demand management system a plurality of priorities for storage area addition requests, the issuing set according to a plurality of predetermined thresholds set to the pool; and wherein if the dynamic volume does not have chunks with data, the storage controller issues a request to the storage on demand management system such that the received key is withdrawn.

5. A data storage system comprising:
   a plurality of first storage systems, each first storage system comprising:
      i. a first storage controller to manage at least one dynamic volume having chunks allocated from a first pool according to a write request position and a chunk allocation status,
      ii. at least one first storage area available for data storage and to be allocated to the first pool,
      iii. a first networking interface to communicate with a storage on demand management system, and
      iv. a first storage network interface to connect to at least one second storage system;
   each at least one second storage system comprising:
      i. a second storage area not available for data storage and secured by a key,
      ii. a second networking interface to communicate with the storage on demand management system; and
      iii. a second storage controller;
   wherein the first storage controller issues a storage area addition request to the storage on demand management system when an amount of unused data storage area in the first pool falls below a predetermined threshold;
   wherein the second storage controller receives the key from the storage on demand management system and uses the received key to cause the second storage area to become available for the plurality of the first storage systems;
   wherein the first storage controller establishes relations between the first pool and the second storage area;
   wherein the first storage controller divides the second storage area in the second storage system into chunks;
   wherein the first storage controller allocates the chunks in the second storage area in the second storage system to the dynamic volume in the plurality of first storage systems;
   wherein the second storage controller unmounts the dynamic volume if the dynamic volume does not have chunks with data;
   wherein the second storage area is a hard disk drive; and wherein if the dynamic volume does not have chunks with data, the second storage controller issues a request to the storage on demand management system such that the received key is withdrawn.

6. The data storage system of claim 5, wherein the storage on demand management system selects a first storage system for allocating the second storage area based on a predetermined information; and wherein if the dynamic volume does not have chunks with data, the first storage controller of the selected first storage system issues a request to the storage on demand management system such that the received key is withdrawn.

7. A data storage system comprising:
   a plurality of first storage systems, each first storage system comprising:
      i. a first storage controller to manage at least one dynamic volume having chunks allocated from a first pool according to a write request position and a chunks allocation status,
      ii. at least one first storage area available for data storage and for allocation to the first pool,
      iii. at least one second storage area not available for data storage and secured by a key,
      iv. a first networking interface to communicate with a storage on demand management system, and
      v. a first storage network interface to connect to at least one second storage system;
   each at least one second storage system comprising;
      i. at least one third storage area not available for data storage and secured by a key, and
      ii. a second networking interface to communicate with the storage on demand management system; and
      iii. a second storage controller;
   wherein the first storage controller issues a storage area addition request to the storage on demand management system when a number of unused chunks in the first pool falls below than predetermined threshold;
   wherein the first storage receives the key from the storage on demand management system and uses the received key to cause the at least one second storage area to become available;
   wherein the second storage controller receives the key from the storage on demand management system and uses the received key to cause the at least one third storage area in the second storage system to become available;

wherein the first storage controller establishes relations between the first pool and the second storage area and/or the third storage area;

wherein the first storage controller divides the second storage area and/or the third storage area into chunks;

wherein the first storage controller allocates chunks in the second storage area and/or third storage area to the dynamic volume;

wherein the second storage controller unmounts the dynamic volume if the dynamic volume does not have chunks with data;

wherein the second storage area is a hard disk drive; and wherein if the dynamic volume does not have chunks with data, the second storage controller issues a request to the storage on demand management system such that the received key is withdrawn.

8. The data storage system of claim 7, wherein the storage on demand management system selects a second storage area and a third storage system based on a predetermined information; and wherein if the dynamic volume does not have chunks with data, the second storage controller issues a request to the storage on demand management system such that the received key is withdrawn.

9. The data storage system of claim 8, wherein the predetermined information is priority information among the first pool.

10. The data storage system of claim 8, wherein the predetermined information is priority information among the first storage system.

11. The data storage system of claim 8, wherein the predetermined information is priority information among owner information of the first storage system.

* * * * *